US012536935B2

(12) United States Patent
Jee et al.

(10) Patent No.: US 12,536,935 B2
(45) Date of Patent: Jan. 27, 2026

(54) DISPLAY DEVICE AND METHOD FOR INSPECTING THE SAME

(71) Applicant: Samsung Display Co., Ltd., Yongin-si (KR)

(72) Inventors: Ahnho Jee, Yongin-si (KR); Heebum Park, Yongin-si (KR); Keunhyuk Youn, Yongin-si (KR); Hak Ki Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/825,384

(22) Filed: Sep. 5, 2024

(65) Prior Publication Data

US 2025/0104584 A1 Mar. 27, 2025

(30) Foreign Application Priority Data

Sep. 21, 2023 (KR) ........................ 10-2023-0126254

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0819* (2013.01); *G09G 2300/0842* (2013.01); *G09G 2310/0254* (2013.01); *G09G 2310/0291* (2013.01)

(58) Field of Classification Search
CPC ............................................. G09G 2300/0426
See application file for complete search history.

(56) References Cited

U.S. PATENT DOCUMENTS

| | | | | |
|---|---|---|---|---|
| 8,570,350 B2 * | 10/2013 | Ikeda | G09G 3/3685 345/690 |
| 2002/0126077 A1 * | 9/2002 | Baek | G09G 3/3696 345/87 |
| 2003/0112207 A1 * | 6/2003 | Kim | G09G 3/3216 345/82 |
| 2005/0146493 A1 * | 7/2005 | Kinjo | G09G 3/3611 345/89 |
| 2005/0200572 A1 * | 9/2005 | Weng | G09G 3/3241 345/76 |
| 2006/0220942 A1 * | 10/2006 | Choi | G09G 3/3291 341/172 |
| 2017/0221419 A1 * | 8/2017 | Xiang | G09G 3/3233 |
| 2022/0028344 A1 * | 1/2022 | Kim | G09G 3/3266 |
| 2022/0076599 A1 * | 3/2022 | Akyol | G09G 3/006 |
| 2023/0316965 A1 | 10/2023 | Jee et al. | |

FOREIGN PATENT DOCUMENTS

KR 1020230139930 A 10/2023

* cited by examiner

*Primary Examiner* — Nan-Ying Yang
(74) *Attorney, Agent, or Firm* — CANTOR COLBURN LLP

(57) ABSTRACT

A display device includes: a display panel configured to display an image corresponding to an image signal, and including pads; and a driving chip configured to provide data signals to the pads. The driving chip includes: an analog part configured to convert an input voltage received through an input line into a driving voltage, and convert an image data signal into the data signals; and buffers configured to receive a buffer voltage through a buffer line that is different from the input line, and output the data signals to the pads.

16 Claims, 18 Drawing Sheets

DISPLAY DEVICE AND METHOD FOR INSPECTING THE SAME

This application claims priority to Korean Patent Application No. 10-2023-0126254, filed on Sep. 21, 2023, and all the benefits accruing therefrom under 35 U.S.C. § 119, the content of which in its entirety is herein incorporated by reference.

BACKGROUND

1. Field

Embodiments relate to a display device. More particularly, embodiments relate to a display device for easily determining defects and a method for inspecting the display device.

2. Description of the Related Art

Multimedia electronic devices such as televisions, mobile phones, tablet computers, navigation systems, and game consoles may include a display device configured to display an image.

In a process of manufacturing a display device, a display device having a defect may be detected in advance through an inspection for determining a defect of a display device. In the inspection for determining the defect of the display device, a test image may be displayed on the display device, and the displayed test image may be analyzed to determine the defect of the display device.

SUMMARY

Embodiments provide a display device for easily determining short defect between pads.

Embodiments provide a method for inspecting a display device for easily determining short defect between pads.

A display device according to embodiments includes: a display panel configured to display an image corresponding to an image signal, and including pads; and a driving chip configured to provide data signals to the pads. The driving chip includes: an analog part configured to convert an input voltage received through an input line into a driving voltage, and convert an image data signal into the data signals; and buffers configured to receive a buffer voltage through a buffer line that is different from the input line, and output the data signals to the pads.

In an embodiment, a level of the buffer voltage may be equal to a level of the input voltage.

In an embodiment, when whether a short defect between the pads exists or not is inspected, odd-numbered buffers among the buffers may be configured to output the data signals, which have a first polarity, and even-numbered buffers among the buffers may be configured to output the data signals, which have a second polarity that is opposite to the first polarity.

In an embodiment, a buffer current flowing through the buffer line when the short defect exists between at least two adjacent pads among the pads may be greater than a buffer current flowing through the buffer line when the short defect does not exist between the pads.

In an embodiment, the driving chip may further include a logic part configured to convert the image signal into the image data signal.

In an embodiment, the display panel may further include data lines connected to the pads, respectively, and pixels connected to the data lines.

In an embodiment, the driving voltage may include a first pixel voltage provided to an anode of a light emitting diode included in each of the pixels, a second pixel voltage provided to a cathode of the light emitting diode, and an initialization voltage for initializing a gate of a driving transistor included in each of the pixels. The first pixel voltage, the second pixel voltage, and the initialization voltage may be provided to each of the pixels.

In an embodiment, the display device may further include a scan block configured to provide scan signals to the pixels.

In an embodiment, the driving voltage may include a high gate voltage for turning off a switching transistor included in each of the pixels and a low gate voltage for turning on the switching transistor. The high gate voltage and the low gate voltage may be provided to the scan block.

In an embodiment, the display device may further include a DC-DC converter configured to convert an external voltage into the input voltage and apply the input voltage to the input line.

In an embodiment, the DC-DC converter may be configured to convert the external voltage into the buffer voltage and apply the buffer voltage to the buffer line.

A method for inspecting a display device, in which the display device includes a display panel configured to display an image corresponding to an image signal and including pads, and a driving chip including buffers configured to provide data signals to the pads, according to embodiments includes: providing a buffer voltage to the buffers through a buffer line; outputting the data signals from the buffers to the pads; measuring a buffer current flowing through the buffer line; and determining whether a short defect between the pads exists or not based on the buffer current.

In an embodiment, in the outputting of the data signals, odd-numbered buffers among the buffers may be configured to output the data signals, which have a first polarity, and even-numbered buffers among the buffers may be configured to output the data signals, which have a second polarity that is opposite to the first polarity.

In an embodiment, the buffer current when the short defect exists between at least two adjacent pads among the pads may be greater than the buffer current when the short defect does not exist between the pads.

In an embodiment, the method may further include determining a defect of a driving driver including the driving chip based on a current measured while enabling the driving driver and disabling the display panel, and determining a defect of the display panel based on a current measured while enabling the driving driver and the display panel.

In an embodiment, the determining of the defect of the display panel may be performed when the driving driver is determined to be normal in the determining of the defect of the driving driver.

In an embodiment, the driving chip may include an analog part configured to convert an image data signal into the data signals, a logic part configured to convert the image signal into the image data signal, and a data output part including the buffers. The determining of the defect of the driving driver may include determining a defect of the logic part based on a current measured while enabling the logic part and disabling the analog part and the data output part, and determining a defect of the analog part based on a current measured while enabling the logic part and the analog part and disabling the data output part.

In an embodiment, the driving driver may further include a scan block configured to provide scan signals to the display panel. The determining of the defect of the driving driver further may include determining a defect of the scan block based on a current measured while enabling the logic part, the analog part, and the scan block and disabling the data output part.

In an embodiment, the determining of the defect of the driving driver may further include determining a defect of the data output part based on a current measured while enabling the logic part, the analog part, the scan block, and the data output part.

In an embodiment, the determining of the defect of the data output part may include the providing of the buffer voltage, the outputting of the data signals, the measuring of the buffer current, and the determining of whether the short defect between the pads exists or not.

In the display device and the method for inspecting the display device according to the embodiments, the buffers may receive the buffer voltage through the buffer line different from the input line transmitting the input voltage to the analog part, and the buffer current flowing through the buffer line may be measured, so that the short defect between the pads of the display panel may be accurately determined based on the buffer current. Accordingly, quality reliability of the display device may be effectively improved by determining whether potential defects are occurred in the display device.

BRIEF DESCRIPTION OF THE DRAWINGS

Illustrative, non-limiting embodiments will be more clearly understood from the following detailed description taken in conjunction with the accompanying drawings.

FIG. 3-1 is a circuit diagram showing a pixel according to an embodiment.

DETAILED DESCRIPTION

Figure 1:
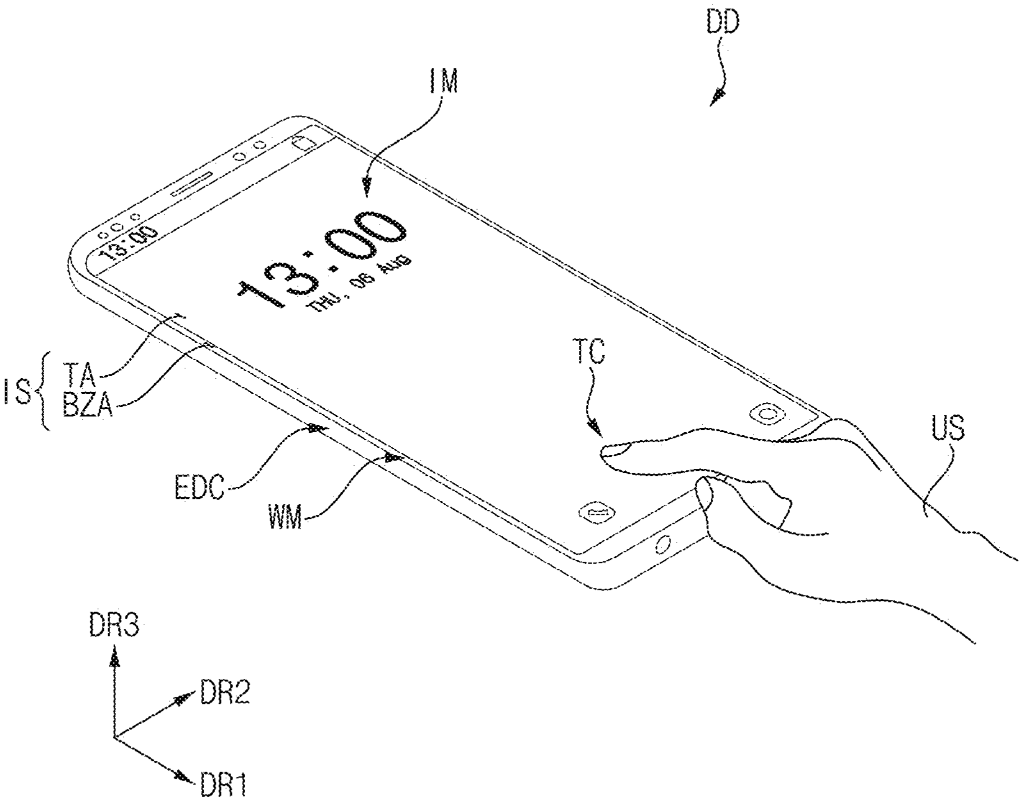
FIG. 1 is a perspective view showing a display device according to an embodiment.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element or "connected to" another element, it can be directly on or directly connected to the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Hereinafter, a display device and a method for inspecting a display device according to embodiments of the present disclosure will be described in more detail with reference to the accompanying drawings. The same or similar reference numerals will be used for the same elements in the accompanying drawings.

FIG. 1 is a perspective view showing a display device DD according to an embodiment.

Referring to FIG. 1, a display device DD may be a device that is activated according to an electrical signal. Although an embodiment in which the display device DD is a smartphone has been shown in FIG. 1, the present disclosure is not limited thereto. According to another embodiment, the display device DD may be a large display device such as a television or a monitor, or a small or medium display device such as a tablet computer, a laptop computer, a car navigation system, or a game console.

The display device DD may have a long side in a first direction DR1 and a short side in a second direction DR2 that intersects the first direction DR1, and may have a quadrangular shape with rounded vertices. However, the shape of the display device DD is not limited thereto, and the display device DD having various shapes may be provided. A display surface IS of the display device DD, which is parallel to the first direction DR1 and the second direction DR2, may display an image IM in a third direction DR3 that intersects the first direction DR1 and the second direction DR2. The display surface IS on which the image IM is displayed may correspond to a front surface of the display device DD.

A front surface (or a top surface) and a rear surface (or a bottom surface) of each of components may be defined based on a direction in which the image IM is displayed. The front and rear surfaces may face each other in the third direction DR3, and a normal direction of each of the front and rear surfaces may be parallel to the third direction DR3.

A separation distance between the front and rear surfaces in the third direction DR3 may correspond to a thickness of the display device DD in the third direction DR3. Directions indicated by the first to third directions DR1, DR2, and DR3 may be relative directions, which may be converted into other directions.

The display device DD may sense an external input TC applied from an outside. The external input TC may include various types of inputs provided from the outside of the display device DD. The external input TC may be one or a combination of various types of external inputs such as a portion of a body of a user US, a light, heat, and a pressure. Although an embodiment in which the external input TC of the user US is a touch input applied to the front surface by a hand of the user US has been shown in FIG. 1, the present disclosure is not limited thereto. In addition, the display device DD may sense the external input TC of the user US applied to a side surface or the rear surface of the display device DD depending on a structure of the display device DD. The display device DD may sense a position (e.g., coordinate information, etc.) of the external input TC.

According to an embodiment, the external input TC may further include an input performed by an input device (e.g., a stylus pen, an active pen, a touch pen, an electronic pen, an e-pen, etc.) in addition to the hand of the user US.

The display surface IS of the display device DD may be divided into a transmission area TA and a bezel area BZA. The transmission area TA may be an area in which the image IM is displayed. The user may visually recognize the image IM through the transmission area TA. The bezel area BZA may be adjacent to the transmission area TA. The bezel area BZA may have a predetermined color. The bezel area BZA may surround the transmission area TA. Accordingly, a shape of the transmission area TA may be substantially defined by the bezel area BZA.

Figure 2:
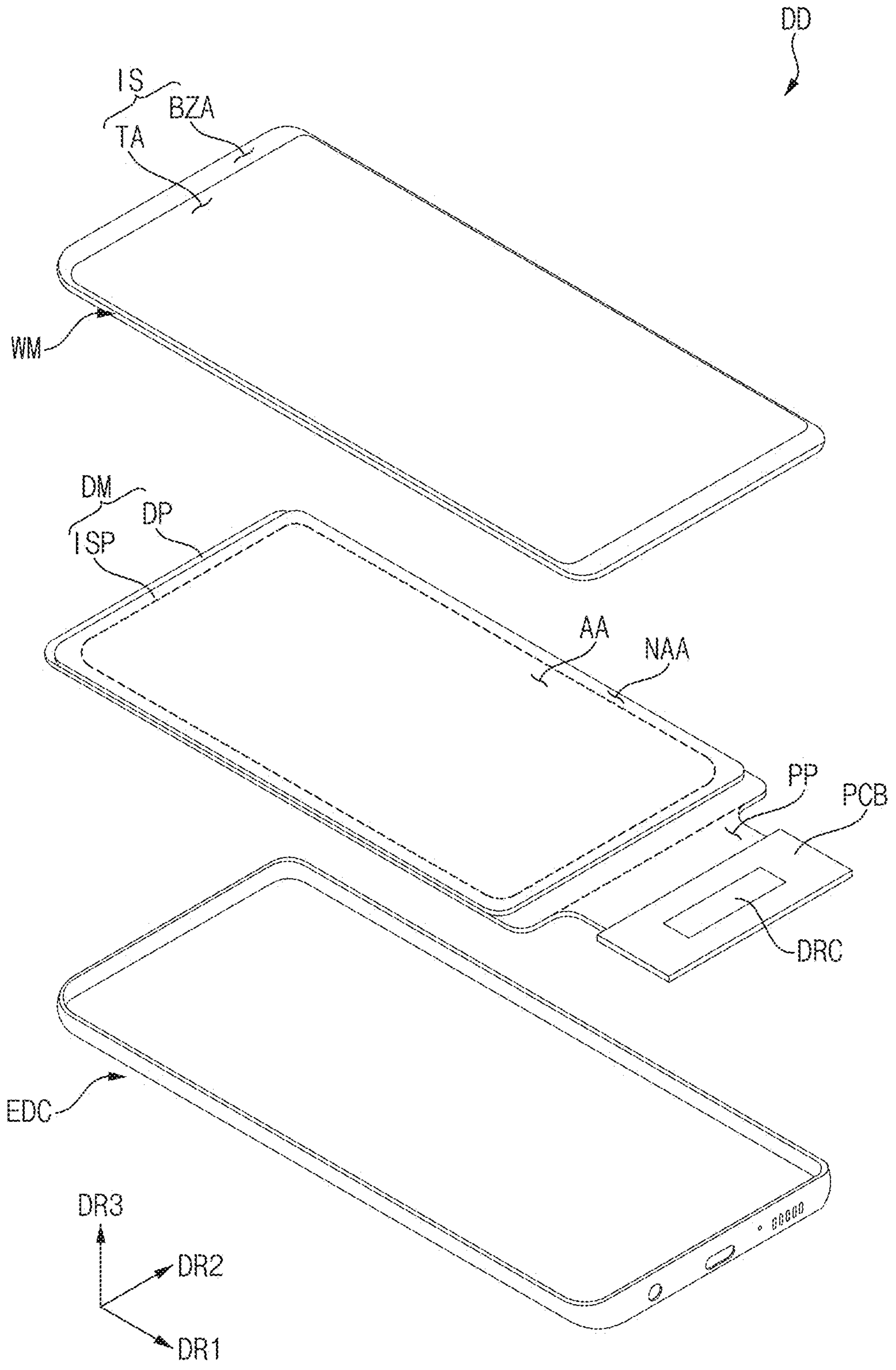
FIG. 2 is an exploded perspective view showing the display device of FIG. 1.

FIG. 2 is an exploded perspective view showing the display device DD of FIG. 1.

Referring to FIGS. 1 and 2, the display device DD may include a window WM, a display module DM, and an external case EDC. The display module DM may include a display panel DP configured to display the image IM according to an electrical signal, and an input sensing layer ISP configured to transmit/receive information on the external input TC.

The window WM may protect a top surface of the display module DM. The window WM may be optically transparent. The window WM may include a transparent material capable of transmitting the image IM. In an embodiment, for example, the window WM may include glass, sapphire, plastic, and/or the like.

The bezel area BZA may be substantially provided as an area in which a material including a predetermined color is printed on one area of the window WM. According to an embodiment, the window WM may include a light blocking pattern for defining the bezel area BZA. The light blocking pattern may be a colored organic film, and may be formed, for example, by a coating scheme.

The window WM may be coupled to the display module DM through an adhesive film. According to an embodiment, the adhesive film may include an optically clear adhesive ("OCA") film. However, the adhesive film is not limited thereto, and according to another embodiment, the adhesive film may include a conventional adhesive or gluing agent. In an embodiment, for example, the adhesive film may include an optically clear resin ("OCR") or a pressure-sensitive adhesive ("PSA") film.

An anti-reflection layer may be further provided between the window WM and the display module DM. The anti-reflection layer may reduce a reflectance of an external light incident from an upper side of the window WM. According to an embodiment, the anti-reflection layer may include a phase retarder and a polarizer. The phase retarder may be a film-type phase retarder or a liquid crystal coating-type phase retarder, and may include a λ/2 phase retarder and/or λ/4 phase retarder. The polarizer may be a film-type polarizer or a liquid crystal coating-type polarizer. The film-type polarizer may include an elongated synthetic resin film, and the liquid crystal coating-type polarizer may include liquid crystals arranged in a predetermined arrangement. The phase retarder and the polarizer may be implemented as one polarizing film.

According to an embodiment, the anti-reflection layer may include color filters. An arrangement of the color filters may be determined in consideration of colors of lights generated by pixels included in the display panel DP. The anti-reflection layer may further include a light blocking pattern.

The display module DM may display the image according to the electrical signal, and may transmit/receive information on the external input. The display module DM may be defined by an active area AA and a non-active area NAA. The active area AA may be defined as an area in which the image IM is displayed from the display panel DP. In addition, the active area AA may be defined as an area in which the input sensing layer ISP senses the external input TC.

The non-active area NAA may be adjacent to the active area AA. In an embodiment, for example, the non-active area NAA may surround the active area AA. According to an embodiment, the active area AA may correspond to at least a portion of the transmission area TA, and the non-active area NAA may correspond to at least a portion of the bezel area BZA.

The display panel DP may be a light emitting display panel. According to an embodiment, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include quantum dots, quantum rods, and/or the like. Hereinafter, the display panel DP will be described as an organic light emitting display panel.

The input sensing layer ISP may be disposed on the display panel DP to sense the external input TC. The input sensing layer ISP may have a multilayer structure. The input sensing layer ISP may include a single insulating layer or multiple insulating layers. According to an embodiment, the input sensing layer ISP may include a single conductive layer or multiple conductive layers, which include a plurality of conductive patterns. According to an embodiment, the conductive patterns may include a plurality of scan electrodes configured to sense the external input TC, and a plurality of signal lines connected to the scan electrodes. According to an embodiment, the input sensing layer ISP may be disposed directly on the display panel DP. According to an embodiment, the input sensing layer ISP may be formed on the display panel DP through successive processes. When the input sensing layer ISP is directly disposed on the display panel DP, the adhesive film may not be disposed between the input sensing layer ISP and the display panel DP. However, the present disclosure is not limited thereto, and the adhesive film may be disposed between the input sensing layer ISP and the display panel DP in another embodiment. In this case, the input sensing layer ISP may be manufactured through a separate process from the display panel DP and fixed to a top surface of the display panel DP by the adhesive film, without being manufactured by successive processes with the display panel DP.

According to an embodiment, the display device DD may further include a driving chip DRC and a flexible circuit film PCB. According to an embodiment, the display panel DP may further include a pad area PP extending from the non-active area NAA.

Pads (PD1 to PDm of FIG. 5) may be disposed in the pad area PP. The display panel DP may be electrically connected to the flexible circuit film PCB through the pads PD1 to PDm. However, the present disclosure is not limited thereto, and some of components included in the driving chip DRC may be mounted on the pad area PP.

According to an embodiment, the driving chip DRC may be mounted on the flexible circuit film PCB. The flexible circuit film PCB may include a plurality of driving elements. The driving elements may include a circuit part configured to drive the display panel DP. According to an embodiment, the pad area PP may be bent so as to be disposed on a back surface of the display panel DP.

The external case EDC may be coupled to the window WM to define an exterior of the display device DD. The external case EDC may absorb a shock applied from the outside, and may prevent foreign substances, moisture, or the like from penetrating into the display module DM to protect components accommodated in the external case EDC. According to an embodiment, the external case EDC may be provided in a form in which a plurality of storage members are coupled to each other.

According to an embodiment, the display device DD may further include an electronic module including various functional modules configured to operate the display module DM, a power supply module configured to supply a power for overall operations of the display device DD, a bracket coupled to the external case EDC to divide an internal space of the display device DD, and the like.

Figure 3:
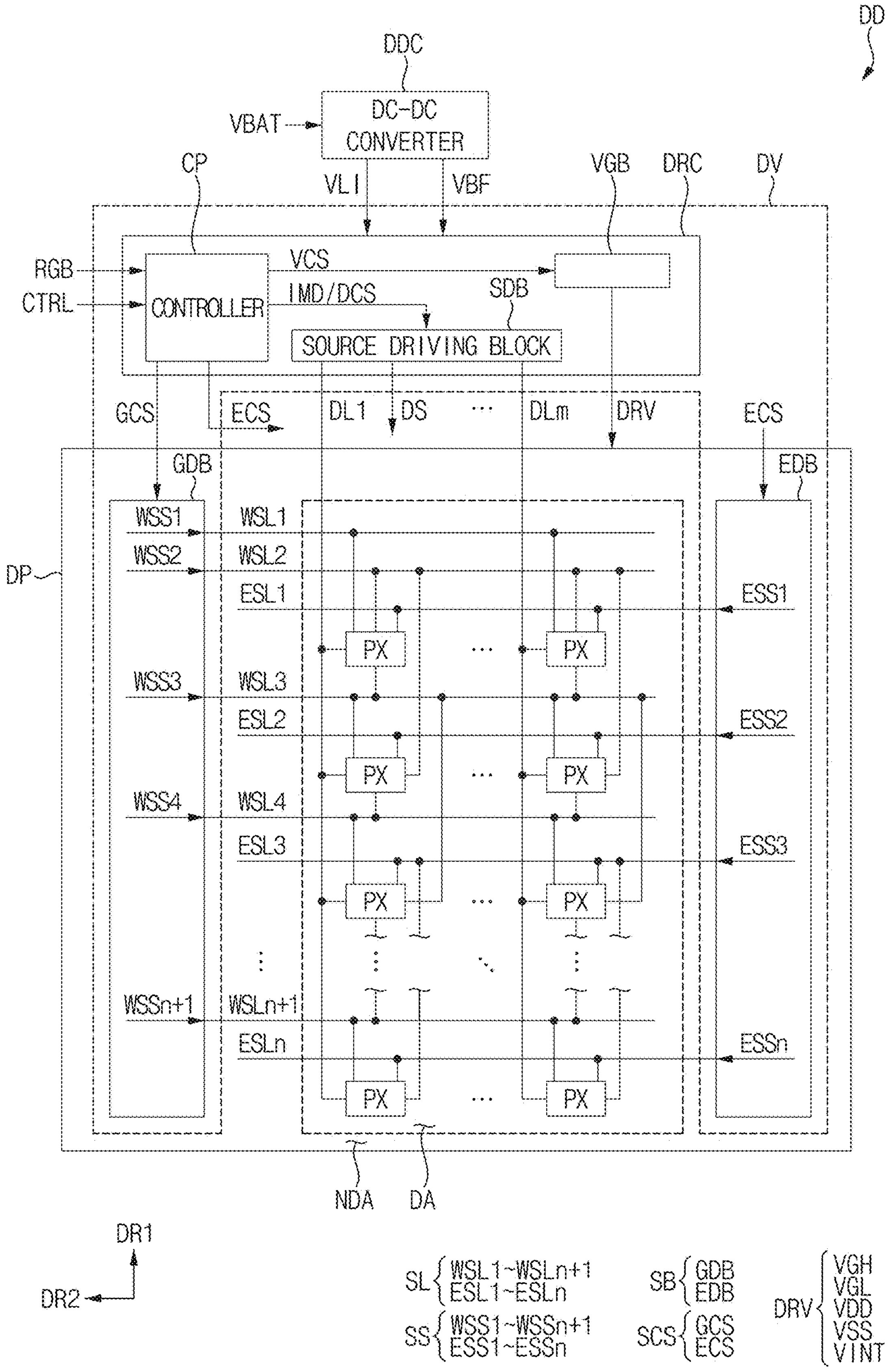
FIG. 3 is a block diagram showing a display device according to an embodiment.
Figures 1, 3:
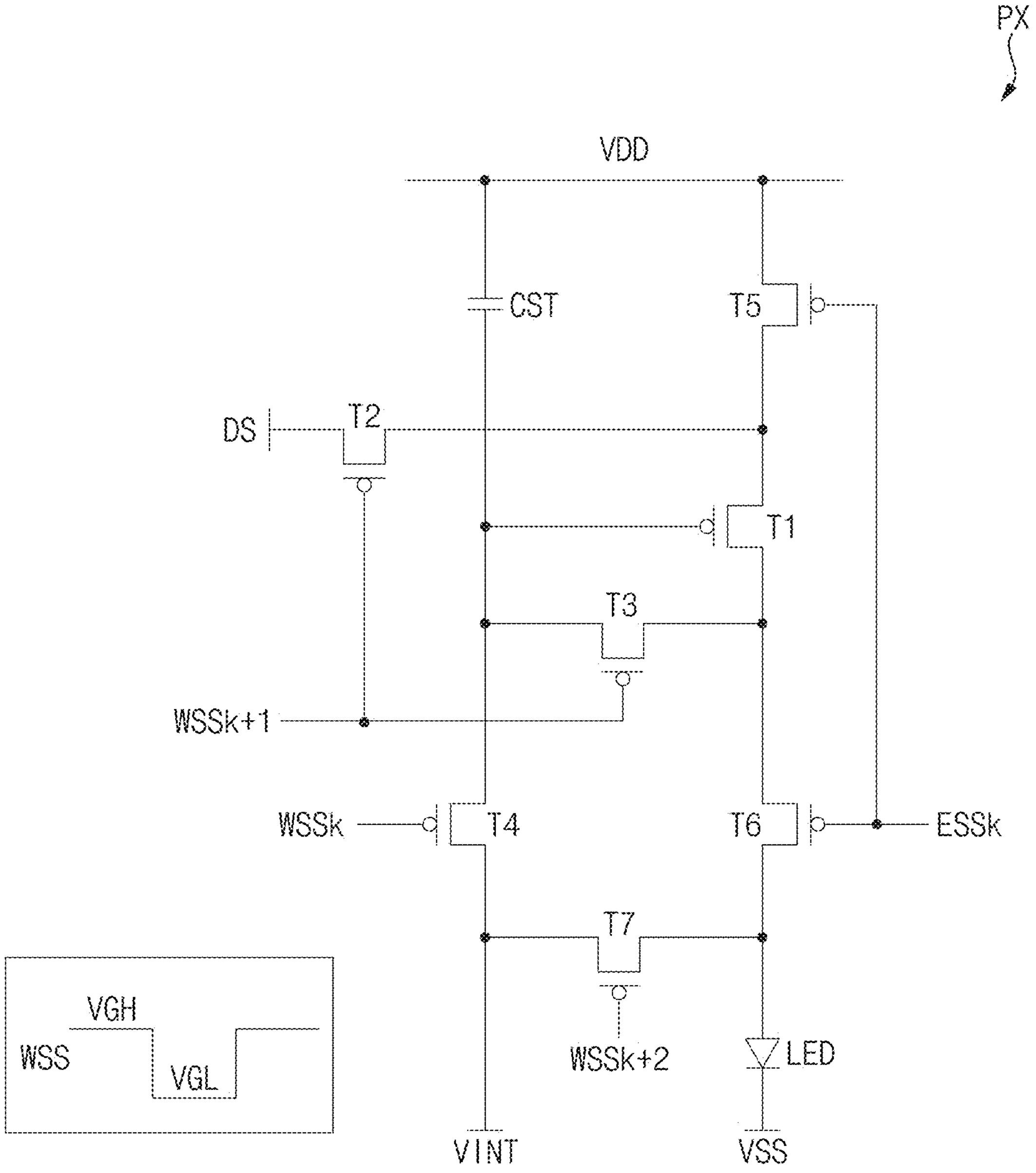

FIG. 3 is a block diagram showing a display device DD according to an embodiment. FIG. 3-1 is a circuit diagram showing a pixel according to an embodiment.

Referring to FIGS. 3 and 3-1, a display device DD may include a display panel DP and a driving driver DV. The driving driver DV may control driving of the display panel DP.

The driving driver DV may include a driving chip DRC and a scan block SB. The driving chip DRC may receive external signals RGB and CTRL, and may generate a data signal DS and a scan control signal SCS corresponding to the display panel DP based on the external signals RGB and CTRL. In detail, the external signals RGB and CTRL may include an image signal RGB and an external control signal CTRL. The driving chip DRC may generate the data signal DS based on the image signal RGB, and may generate the scan control signal SCS based on the external control signal CTRL. The scan block SB may generate a scan signal SS for displaying an image (IM of FIG. 1) on the display panel DP. The display panel DP may display the image IM based on the data signal DS and the scan signal SS. According to an embodiment, the scan signal SS may include write scan signals WSS1 to WSSn+1 and emission scan signals ESS1 to ESSn.

The driving chip DRC may include a controller CP, a source driving block SDB, and a voltage generation block VGB.

The controller CP may receive the image signal RGB and the external control signal CTRL. The controller CP may generate an image data signal IMD obtained by converting a data format of the image signal RGB to meet an interface specification with the source driving block SDB. The controller CP may output the scan control signal SCS, a source control signal DCS, and a voltage control signal VCS based on the external control signal CTRL. The scan control signal SCS may include a gate control signal GCS and an emission control signal ECS.

The source driving block SDB may receive the source control signal DCS and the image data signal IMD from the controller CP. The source driving block SDB may convert the image data signal IMD into the data signal DS, and output the data signal DS to data lines DL1 to DLm, which will be described below. The data signal DS may be each of analog voltages corresponding to gray level values of the image data signal IMD.

The voltage generation block VGB may generate a driving voltage DRV for an operation of the display panel DP. According to an embodiment, the driving voltage DRV may include a high gate voltage VGH, a low gate voltage VGL, a first pixel voltage VDD, a second pixel voltage VSS, an initialization voltage VINT, and/or the like. The voltage generation block VGB may provide the high gate voltage VGH and the low gate voltage VGL to the scan block SB, and provide the first pixel voltage VDD, the second pixel voltage VSS, and the initialization voltage VINT to pixels PX. The voltage generation block VGB may provide the first pixel voltage VDD, the second pixel voltage VSS, and the initialization voltage VINT to driving voltage lines electrically connected to the pixels PX. The pixels PX may generate lights based on the data signal DS, the scan signal SS, the first pixel voltage VDD, the second pixel voltage VSS, and the initialization voltage VINT.

According to an embodiment, the scan block SB may include a gate driving block GDB and an emission driving block EDB. The gate driving block GDB may receive the gate control signal GCS from the controller CP. The gate driving block GDB may generate the write scan signals WSS1 to WSSn+1 based on the gate control signal GCS, and sequentially output the write scan signals WSS1 to WSSn+1 to a plurality of write scan lines WSL1 to WSLn+1, which will be described below. The emission driving block EDB may receive the emission control signal ECS from the controller CP. The emission driving block EDB may generate the emission scan signals ESS1 to ESSn based on the emission control signal ECS, and sequentially output the emission scan signals ESS1 to ESSn to a plurality of emission scan lines ESL1 to ESLn, which will be described below.

The display panel DP may include a display area DA corresponding to a transmission area (TA of FIG. 1) and a non-display area NDA corresponding to a bezel area (BZA of FIG. 1).

The display panel DP may include a plurality of scan lines SL, a plurality of data lines DL1 to DLm, and a plurality of pixels PX. According to an embodiment, the scan lines SL may include a plurality of write scan lines WSL1 to WSLn+1 and a plurality of emission scan lines ESL1 to ESLn.

The pixels PX may be arranged within the display area DA. According to an embodiment, the write scan lines WSL1 to WSLn+1 and the emission scan lines ESL1 to ESLn may extend in the second direction DR2. The write scan lines WSL1 to WSLn+1 and the emission scan lines ESL1 to ESLn may be spaced apart from each other in the first direction DR1. The data lines DL1 to DLm may extend in the first direction DR1, and may be spaced apart from each other in the second direction DR2.

Each of the pixels PX may be electrically connected to three write scan lines corresponding to the pixel PX among the write scan lines WSL1 to WSLn+1. In addition, each of the pixels PX may be electrically connected to one emission scan line corresponding to the pixel PX among the emission scan lines ESL1 to ESLn and one data line corresponding to the pixel PX among the data lines DL1 to DLm. However, a connection relation between the pixels PX and the write scan lines WSL1 to WSLn+1, the emission scan lines ESL1 to ESLn, and the data lines DL1 to DLm may vary depending on a configuration of a pixel circuit part of each of the pixels PX.

Each of the pixels PX may include a light emitting diode LED, and a pixel circuit part configured to control light emission of the light emitting diode LED. The pixel circuit part may include a driving transistor T1, a plurality of switching transistors T2, T3, T4, T5, T6, and T7, and a storage capacitor CST. Each of the pixels PX may receive the first pixel voltage VDD, the second pixel voltage VSS, and the initialization voltage VINT from the voltage generation block VGB. The first pixel voltage VDD may be provided to an anode of the light emitting diode LED, and the second pixel voltage VSS may be provided to a cathode of the light emitting diode LED. The initialization voltage VINT may initialize a gate of the driving transistor T1.

The gate driving block GDB and the emission driving block EDB may be disposed in the non-display area NDA of the display panel DP. The gate driving block GDB may sequentially supply the write scan signals WSS1 to WSSn+1 to the write scan lines WSL1 to WSLn+1. The emission driving block EDB may sequentially supply the emission scan signals ESS1 to ESSn to the emission scan lines ESL1 to ESLn. Each of the gate driving block GDB and the emission driving block EDB may receive the high gate voltage VGH and the low gate voltage VGL from the voltage generation block VGB. The gate driving block GDB may generate the write scan signals WSS1 to WSSn+1 based on the high gate voltage VGH and the low gate voltage VGL, and the emission driving block EDB may generate the emission scan signals ESS1 to ESSn based on the high gate voltage VGH and the low gate voltage VGL. According to an embodiment, the high gate voltage VGH may be a voltage for turning off the switching transistor included in each of the pixels PX, and the low gate voltage VGL may be a voltage for turning on the switching transistor included in each of the pixels PX. However, the present disclosure is not limited thereto, and according to another embodiment, the high gate voltage VGH may be a voltage for turning on the switching transistor included in each of the pixels PX, and the low gate voltage VGL may be a voltage for turning off the switching transistor included in each of the pixels PX.

According to an embodiment, the display device DD may further include a DC-DC converter DDC. The DC-DC converter DDC may receive an external voltage VBAT. In an embodiment, for example, the external voltage VBAT may be a voltage provided from a battery. The DC-DC converter DDC may generate an input voltage VLI by converting a level of the external voltage VBAT, and transmit the input voltage VLI to the driving chip DRC.

According to an embodiment, the DC-DC converter DDC may generate a buffer voltage VBF by converting the level of the external voltage VBAT, and transmit the buffer voltage VBF to the driving chip DRC. However, the present disclosure is not limited thereto, and according to another embodiment, the driving chip DRC may receive the buffer voltage VBF from an outside.

Figure 4:
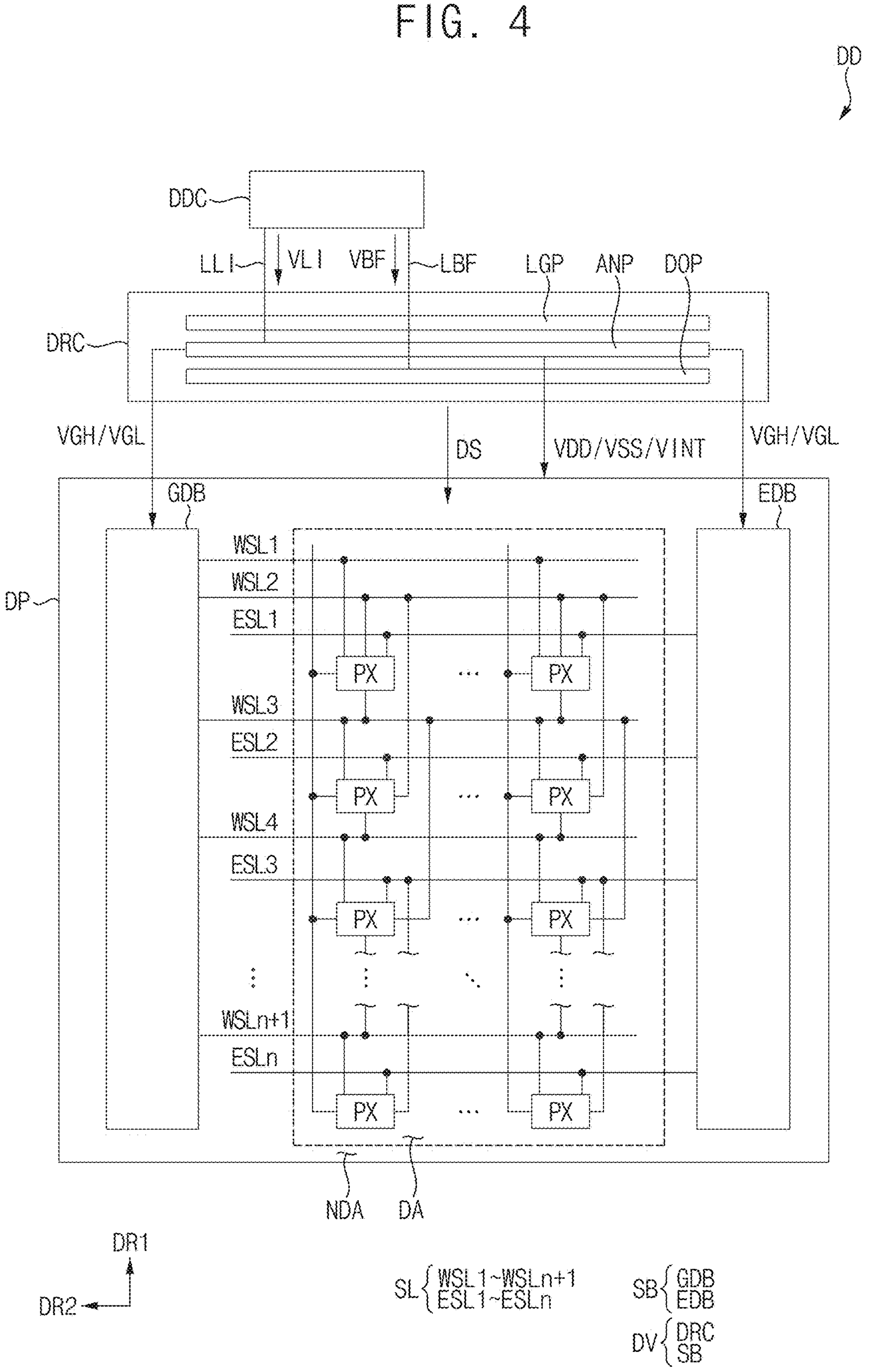
FIG. 4 is a block diagram showing the display device according to an embodiment.

FIG. 4 is a block diagram showing the display device DD according to an embodiment.

Referring to FIGS. 3 and 4, the driving chip DRC may include a logic part LGP, an analog part ANP, and a data output part DOP.

Among the controller CP, the source driving block SDB, and the voltage generation block VGB included in the driving chip DRC, a component configured to generate a digital signal to be provided to the display panel DP based on the image signal RGB and the external control signal CTRL may be referred to as a "logic part" LGP. According to an embodiment, the digital signal may include a gate control signal GCS, an emission control signal ECS, a source control signal DCS, a voltage control signal VCS, and an image data signal IMD. Among the controller CP, the source driving block SDB, and the voltage generation block VGB included in the driving chip DRC, a component configured to generate an analog signal to be provided to the display panel DP based on the digital signal generated by the logic part LGP may be referred to as an "analog part" ANP. According to an embodiment, the analog signal may include a data signal DS and a driving voltage DRV Among the controller CP, the source driving block SDB, and the voltage generation block VGB included in the driving chip DRC, a component configured to transmit the data signal DS generated by the analog part ANP to the display panel DP may be referred to as a "data output part" DOP.

According to an embodiment, the driving voltage DRV may include a high gate voltage VGH, a low gate voltage VGL, a first pixel voltage VDD, a second pixel voltage VSS, and an initialization voltage VINT. The analog part ANP may transmit the high gate voltage VGH and the low gate voltage VGL to each of the gate driving block GDB and the emission driving block EDB, and may transmit the first pixel voltage VDD, the second pixel voltage VSS, and the initialization voltage VINT to each of the pixels PX.

The analog part ANP may receive the input voltage VLI from the DC-DC converter DDC through an input line LLI. According to an embodiment, the data output part DOP may receive the buffer voltage VBF from the DC-DC converter DDC through a buffer line LBF. However, the present disclosure is not limited thereto, and according to another embodiment, the data output part DOP may receive the buffer voltage VBF from the outside through the buffer line LBF.

According to an embodiment, a level of the buffer voltage VBF may be equal to a level of the input voltage VLI. In an embodiment, for example, each of the level of the buffer voltage VBF and the level of the input voltage VLI may be about 7.3 volts (V).

Figure 5:
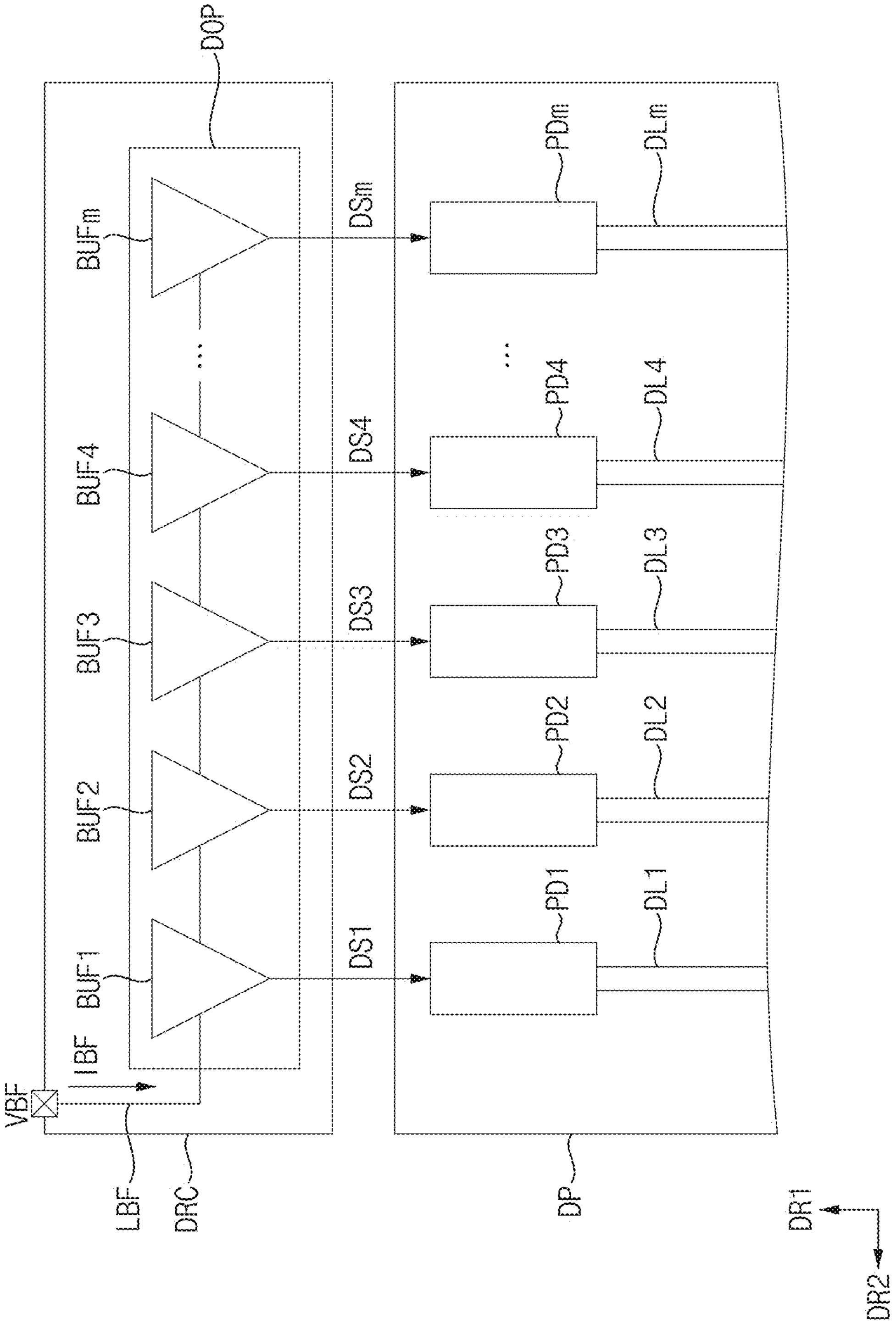
FIG. 5 is a view for describing a display panel and a driving chip included in the display device of FIG. 4.

FIG. 5 is a view for describing a display panel DP and a driving chip DRC included in the display device DD of FIG. 4.

Referring to FIG. 5, the display panel DP may include pads PD1, PD2, PD3, PD4, . . . , and PDm disposed in a pad area (PP of FIG. 2). The pads PD1, PD2, PD3, PD4, . . . , and PDm may be spaced apart from each other in the second direction DR2. The pads PD1, PD2, PD3, PD4, . . . , and PDm may be connected to the data lines DL1, DL2, DL3, DL4, . . . , and DLm, respectively.

The data output part DOP of the driving chip DRC may include buffers BUF1, BUF2, BUF3, BUF4, . . . , and BUFm. The buffers BUF1, BUF2, BUF3, BUF4, . . . , and BUFm may be spaced apart from each other in the second direction DR2. The buffers BUF1, BUF2, BUF3, BUF4, . . . , and BUFm may output the data signals DS1, DS2, DS3, DS4, . . . , and DSm to the pads PD1, PD2, PD3, PD4, . . . , and PDm. The buffers BUF1, BUF2, BUF3, BUF4, . . . , and BUFm may receive the buffer voltage VBF through the buffer line LBF.

According to an embodiment, when whether a short defect between the pads PD1, PD2, PD3, PD4, . . . , and PDm exists or not is inspected, odd-numbered buffers BUF1, BUF3, . . . among the buffers BUF1, BUF2, BUF3, BUF4, . . . , and BUFm may output the data signals DS1, DS3, . . . having a first polarity, and even-numbered buffers BUF2, BUF4, . . . among the buffers BUF1, BUF2, BUF3, BUF4, . . . , and BUFm may output the data signals DS2, DS4, . . . having a second polarity that is opposite to the first polarity. In an embodiment, for example, when the first polarity is a positive polarity, the second polarity may be a negative polarity, and when the first polarity is a negative polarity, the second polarity may be a positive polarity. Since the polarities of the data signals applied to the pads adjacent to each other in the second direction DR2 are different from each other, when a short defect exists between the adjacent pads, a potential difference may occur between the adjacent pads, and a current may flow between the shorted pads.

A buffer current IBF flowing through the buffer line LBF when a short defect exists between at least two adjacent pads among the pads PD1, PD2, PD3, PD4, . . . , and PDm may be greater than a buffer current IBF flowing through the buffer line LBF when the short defect does not exist between the pads PD1, PD2, PD3, PD4, . . . , and PDm. The current flowing between the shorted pads may affect the buffer line LBF by an electrical connection between the pads PD1, PD2, PD3, PD4, . . . , and PDm and the buffers BUF1, BUF2, BUF3, BUF4, . . . , and BUFm, and the buffer current IBF flowing through the buffer line LBF may be increased by the current flowing between the shorted pads. Accordingly, whether the short defect between the pads PD1, PD2, PD3, PD4, . . . , and PDm exists or not may be determined based on the buffer current IBF flowing through the buffer line LBF.

Figure 6:
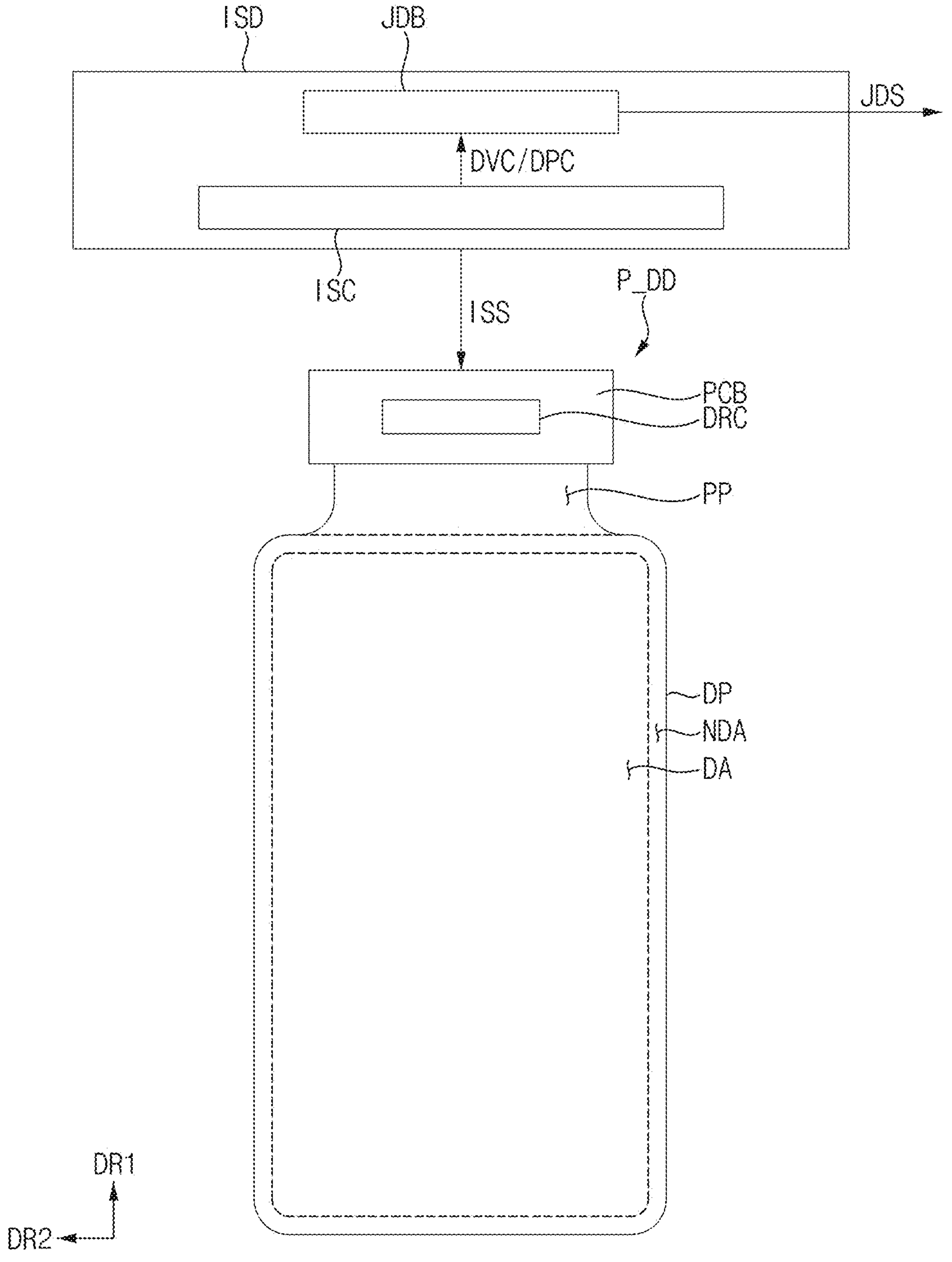
FIG. 6 is a block diagram showing an inspection device according to an embodiment.
Figure 7:
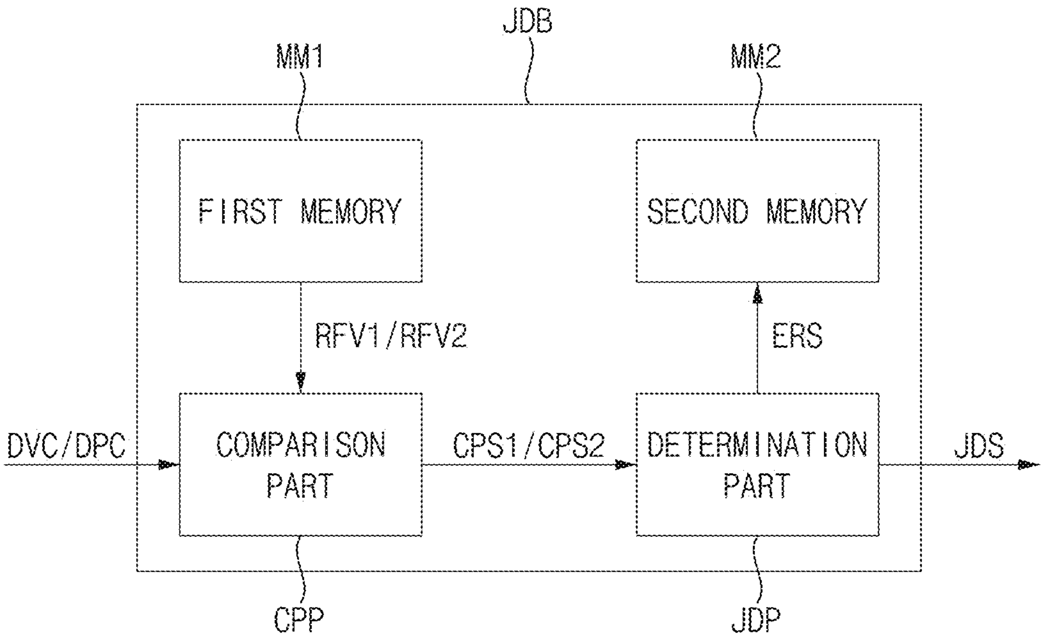
FIG. 7 is a block diagram showing a determination block included in the inspection device of FIG. 6.

FIG. 6 is a block diagram showing an inspection device ISD according to an embodiment. FIG. 7 is a block diagram showing a determination block JDB included in the inspection device ISD of FIG. 6.

Referring to FIGS. 6 and 7, according to an embodiment, an inspection device ISD for a display device (DD of FIG. 1) may include an inspection controller ISC and a determination block JDB. FIG. 6 shows some of components (a display panel DP, a flexible circuit film PCB, and a driving chip DRC) of the display device DD. In a process of manufacturing the display device DD, after the display panel DP, the flexible circuit film PCB, and the driving chip DRC are manufactured, defects of the display panel DP, the flexible circuit film PCB, and the driving chip DRC may be determined through the inspection device ISD. Accordingly, a defect of the display device DD including the display panel DP, the flexible circuit film PCB, and the driving chip DRC may be determined. Hereinafter, for convenience of description, a state in which the display panel DP, the flexible circuit film PCB, and the driving chip DRC are manufactured in the process of manufacturing the display device DD will be referred to as a preliminary display device P_DD. In this case, the inspection device ISD may inspect a defect of the preliminary display device P_DD. The display device DD may be manufactured by using the preliminary display device P_DD that has been determined to be normal through the inspection device ISD. However, the present disclosure is not limited thereto, and a defect of a finished display device DD may be determined by using the inspection device ISD.

The inspection device ISD may provide an inspection signal ISS to the driving chip DRC. The inspection signal ISS may be a signal for enabling the preliminary display device P_DD in stage-by-stage basis and may include first to eight inspection signals ISS1 to ISS8. The inspection device ISD may measure currents DVC and DPC provided to the preliminary display device P_DD while enabling the preliminary display device P_DD in stage-by-stage basis through the inspection signal ISS. The inspection device ISD may analyze the measured currents DVC and DPC to generate a determination signal JDS for determining a defect of each of components included in the preliminary display device P_DD, which is activated at each stage in which the preliminary display device P_DD is enabled. Hereinafter, for convenience of description, the inspection device ISD will be described as determining a defect of the display panel DP and a defect of a driving driver (DV of FIG. 3) including a scan block (SB of FIG. 3), which is included in the driving chip DRC and the display panel DP.

In detail, the inspection controller ISC may provide the inspection signal ISS to the driving chip DRC. The inspection controller ISC may enable the driving driver DV and disable the display panel DP through the inspection signal ISS. In addition, the inspection controller ISC may enable the driving driver DV and the display panel DP through the inspection signal ISS. The inspection controller ISC may measure a current DVC (hereinafter referred to as a "driving operation current") provided to the preliminary display device P_DD while enabling the driving driver DV and disabling the display panel DP, or a current DPC (hereinafter referred to as a "display operation current") provided to the preliminary display device P_DD while enabling both the driving driver DV and the display panel DP. The inspection controller ISC may provide the measured driving operation current DVC and the measured display operation current DPC to the determination block JDB. The determination block JDB may generate a determination signal JDS for determining a defect of the driving driver DV or the display panel DP based on the driving operation current DVC and the display operation current DPC. The inspection device ISD may further include a display part configured to receive the determination signal JDS to display the defect of the driving driver DV or the display panel DP. In addition, the inspection device ISD may further include a separate current measurement part configured to measure the driving operation current DVC and the display operation current DPC provided to the preliminary display device P_DD.

The determination block JDB may include a comparison part CPP, a determination part JDP, a first memory MM1, and a second memory MM2. According to an embodiment, reference values RFV1 and RFV2 measured in advance may be stored in the first memory MM1. The reference values RFV1 and RFV2 may include a magnitude of an operation current provided to the preliminary display device P_DD while only the drive driver DV in a normal state is enabled, and a magnitude of an operation current provided to the preliminary display device P_DD while the driving driver DV and the display panel DP in a normal state are enabled. The reference values RFV1 and RFV2 may include a first reference value RFV1, which is an average value of the driving operation current DVC provided to the preliminary display device P_DD measured several times in advance while only the driving driver DV in the normal state is enabled. In addition, the reference values RFV1 and RFV2 may include a second reference value RFV2, which is an average value of the display operation current DPC provided to the preliminary display device P_DD measured several times in advance while the driving driver DV and the display panel DP in the normal state are enabled.

The comparison part CPP may receive the first reference value RFV1 and the second reference value RFV2 from the first memory MM1, and may receive the driving operation current DVC and the display operation current DPC from the inspection controller ISC. The comparison part CPP may generate a first comparison signal CPS1 by comparing the first reference value RFV1 with the driving operation current DVC, and generate a second comparison signal CPS2 by comparing the second reference value RFV2 with the display operation current DPC. In an embodiment, the comparison part CPP may generate the first comparison signal CPS1 based on a difference between a magnitude of the driving operation current DVC and the first reference value RFV1, and generate the second comparison signal CPS2 based on a difference between a magnitude of the display operation current DPC and the second reference value RFV2.

The determination part JDP may receive the first and second comparison signals CPS1 and CPS2 from the comparison part CPP. The determination part JDP may determine the defect of the driving driver DV or the display panel DP based on the first and second comparison signals CPS1 and CPS2. According to an embodiment, the determination part JDP may determine the defect of the driving driver DV by comparing a magnitude difference between the magnitude of the driving operation current DVC and the first reference value RFV1 with a preset tolerance value based on the first comparison signal CPS1 received while only the driving driver DV is enabled. When the magnitude difference between the magnitude of the driving operation current DVC and the first reference value RFV1 is less than the tolerance value, the determination part JDP may determine that the driving driver DV is normal. When the magnitude difference between the magnitude of the driving operation current DVC and the first reference value RFV1 is greater than or equal to the tolerance value, the determination part JDP may determine that the driving driver DV is defective. According to an embodiment, the determination part JDP may determine the defect of the display panel DP by comparing a magnitude difference between the magnitude of the display operation current DPC and the second reference value RFV2 with a preset tolerance value based on the second comparison signal CPS2 received while the driving driver DV and the display panel DP are enabled. When the magnitude difference between the magnitude of the display operation current DPC and the second reference value RFV2 is less than the tolerance value, the determination part JDP may determine that the display panel DP is normal. When the magnitude difference between the magnitude of the display operation current DPC and the second reference value RFV2 is greater than or equal to the tolerance value, the determination part JDP may determine that the display panel DP is defective.

According to an embodiment, the tolerance value while only the drive driver DV is enabled may be a value proportional to a standard deviation value of the operation current provided to the preliminary display device P_DD measured several times in advance while only the driving driver DV in the normal state is enabled. In addition, the tolerance value while the driving driver DV and the display panel DP are enabled may be a value proportional to a standard deviation value of the operation current provided to the preliminary display device P_DD measured several times in advance while the driving driver DV and the display panel DP in the normal state are enabled.

According to an embodiment, the determination part JDP may determine that a portion of a circuit included in the driving driver DV has an open defect when the magnitude difference between the magnitude of the driving operation current DVC and the first reference value RFV1 is less than the first reference value RFV1 by the tolerance value or more. The determination part JDP may determine that a portion of the circuit included in the driving driver DV has a short defect when the magnitude difference between the magnitude of the driving operation current DVC and the first reference value RFV1 is greater than the first reference value RFV1 by the tolerance value or more.

According to an embodiment, the determination part JDP may determine that a portion of a circuit included in the display panel DP has an open defect when the magnitude difference between the magnitude of the display operation current DPC and the second reference value RFV2 is less than the second reference value RFV2 by the tolerance value or more. The determination part JDP may determine that a portion of the circuit included in the display panel DP has a short defect when the magnitude difference between the magnitude of the display operation current DPC and the second reference value RFV2 is greater than the second reference value RFV2 by the tolerance value or more.

The determination part JDP may provide a defect information signal ERS to the second memory MM2 when determining that the driving driver DV or the display panel DP has a defect. Accordingly, information on a defect that may occur in the driving driver DV or the display panel DP during the process of manufacturing the display device DD may be stored in the second memory MM2.

The determination part JDP may determine a defect of the preliminary display device P_DD based on the first and second comparison signals CPS1 and CPS2, and generate the determination signal JDS.

Figure 8:
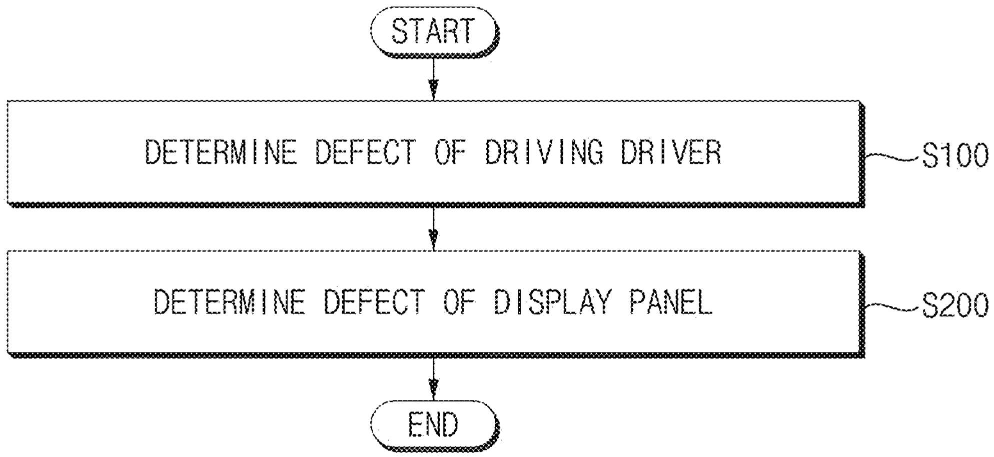
FIGS. 8 and 9 are flowcharts showing a method for inspecting a display device DD according to an embodiment.
Figure 9:
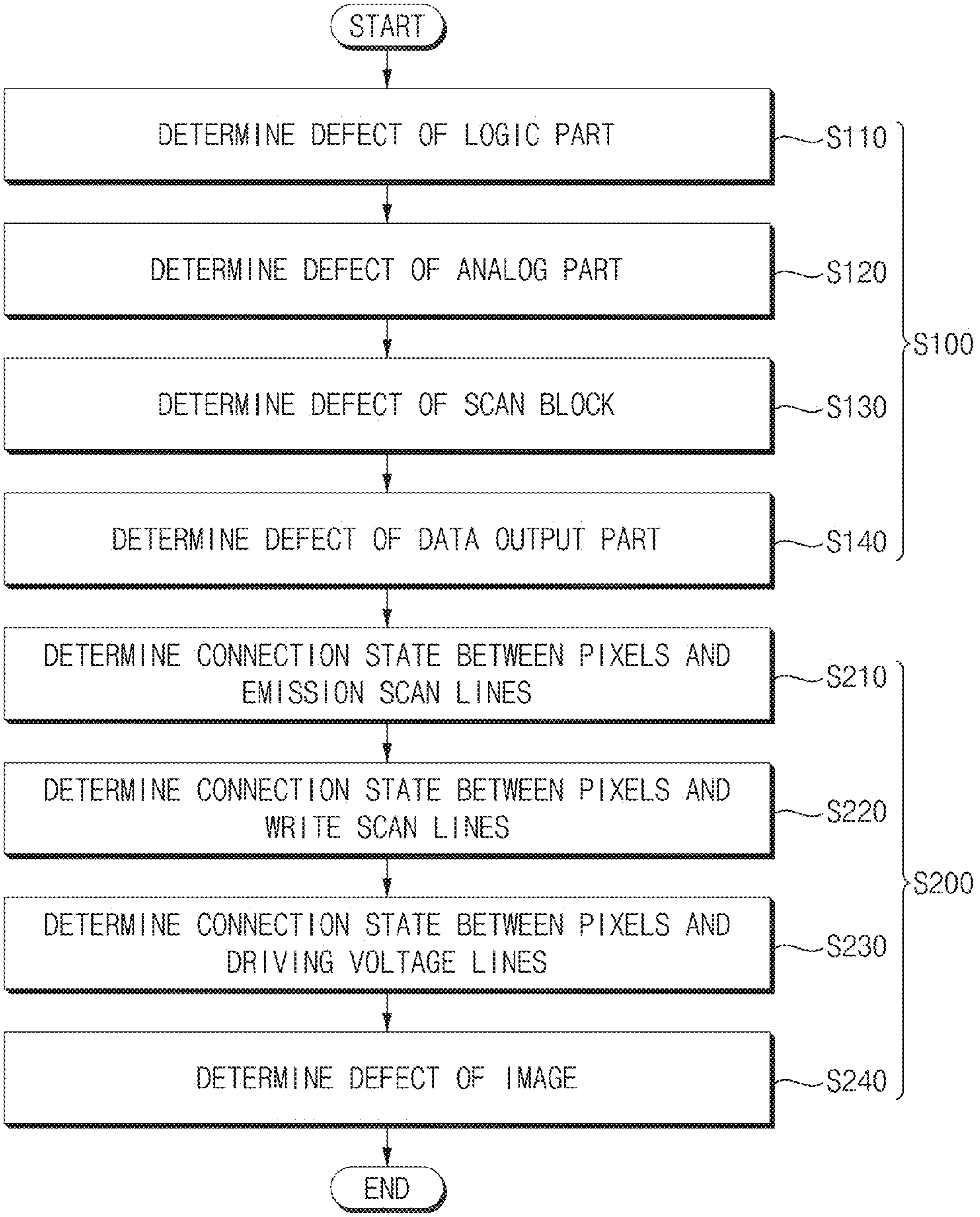
Figure 10:
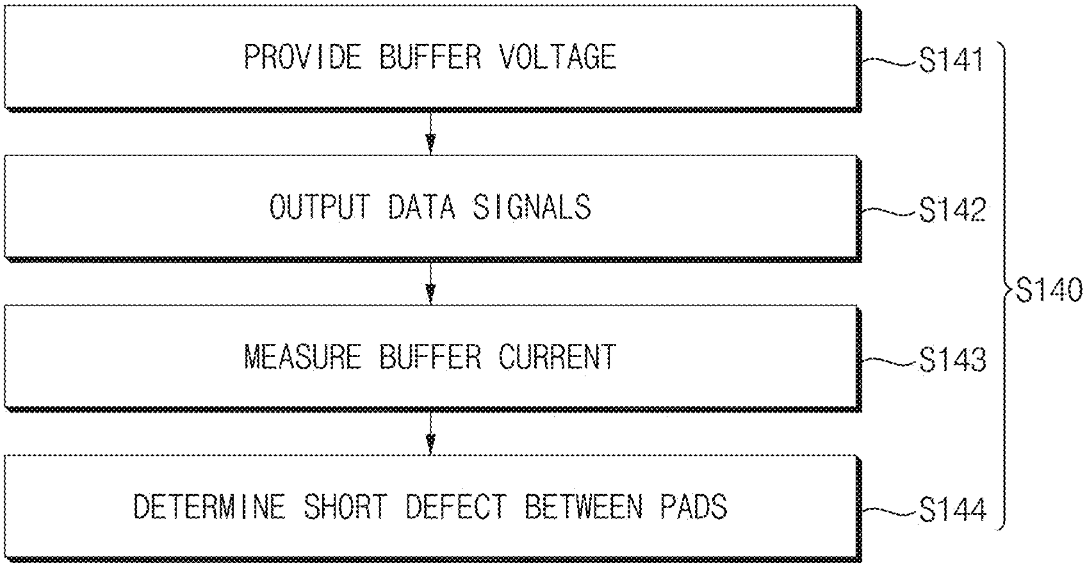
FIG. 10 is a flowchart showing a method for determining a defect of a data output part DOP according to an embodiment.

FIGS. 8 and 9 are flowcharts showing a method for inspecting a display device DD according to an embodiment. FIG. 10 is a flowchart showing a method for determining a defect of a data output part DOP according to an embodiment.

Referring to FIGS. 4 to 6 and 8 to 10, a method for inspecting a display device DD may include measuring a current DVC provided to a preliminary display device P_DD while enabling a driving driver DV and disabling a display panel DP and determining a defect of the driving driver DV based on the measured driving operation current by using an inspection device ISD (S100). In addition, the method for inspecting the display device DD may include measuring a current DPC provided to the preliminary display device P_DD while enabling the driving driver DV and the display panel DP and determining a defect of the display panel DP based on the measured display operation current by using the inspection device ISD (S200). According to an embodiment, the determining of the defect of the display panel DP (S200) may be performed after the determining of the defect of the driving driver DV (S100).

The determining of the defect of the driving driver DV (S100) may include: determining a defect of a logic part LGP (S110); determining a defect of an analog part ANP (S120); determining a defect of a scan block SB (S130); and determining a defect of a data output part DOP (S140). According to an embodiment, the determining of the defect of the analog part ANP (S120) may be performed after the determining of the defect of the logic part LGP (S110). The determining of the defect of the scan block SB (S130) may be performed after the determining of the defect of the analog part ANP (S120). The determining of the defect of the data output part DOP (S140) may be performed after the determining of the defect of the scan block SB (S130).

The determining of the defect of the display panel DP (S200) may include: determining a connection state between pixels PX and emission scan lines ESL1 to ESLn (S210); determining a connection state between the pixels PX and write scan lines WSL1 to WSLn+1 (S220); determining a connection state between the pixels PX and driving voltage lines (S230); and determining a defect of an image IM displayed on the display panel DP (S240). According to an embodiment, the determining of the connection state between the pixels PX and the write scan lines WSL1 to WSLn+1 (S220) may be performed after the determining of the connection state between the pixels PX and the emission scan lines ESL1 to ESLn (S210). the determining the connection state between the pixels PX and the driving voltage lines (S230) may be performed after the determining of the connection state between the pixels PX and the write scan lines WSL1 to WSLn+1 (S220). The determining of the defect of the image IM displayed on the display panel DP (S240) may be performed after the determining of the connection state between the pixels PX and the driving voltage lines (S230).

The determining of the defect of the data output part DOP (S140) may include: providing a buffer voltage VBF to buffers BUF1, BUF2, BUF3, BUF4, . . . , and BUFm through a buffer line LBF (S141); outputting data signals DS1, DS2, DS3, DS4, . . . , and DSm from the buffers BUF1, BUF2, BUF3, BUF4, . . . , and BUFm to pads PD1, PD2, PD3, PD4, . . . , and PDm (S142); measuring a buffer current IBF flowing through the buffer line LBF (S143); and determining whether a short defect between the pads PD1, PD2, PD3, PD4, . . . , and PDm exists or not based on the buffer current IBF (S144). According to an embodiment, when outputting data signals DS1, DS2, DS3, DS4, . . . , and DSm from the buffers BUF1, BUF2, BUF3, BUF4, . . . , and BUFm to pads PD1, PD2, PD3, PD4, . . . , and PDm, odd-numbered buffers BUF1, BUF3, . . . among the buffers BUF1, BUF2, BUF3, BUF4, . . . , and BUFm may output the data signals DS1, DS3, . . . having a first polarity, and even-numbered buffers BUF2, BUF4, . . . among the buffers BUF1, BUF2, BUF3, BUF4, . . . , and BUFm may output the data signals DS2, DS4, . . . having a second polarity that is opposite to the first polarity. The buffer current IBF flowing through the buffer line LBF when a short defect exists between at least two adjacent pads among the pads PD1, PD2, PD3, PD4, . . . , and PDm may be greater than the buffer current IBF flowing through the buffer line LBF when the short defect does not exist between the pads PD1, PD2, PD3, PD4, . . . , and PDm.

FIGS. 11 to 18 are views for describing the method for inspecting the display device according to an embodiment.

Figure 11:
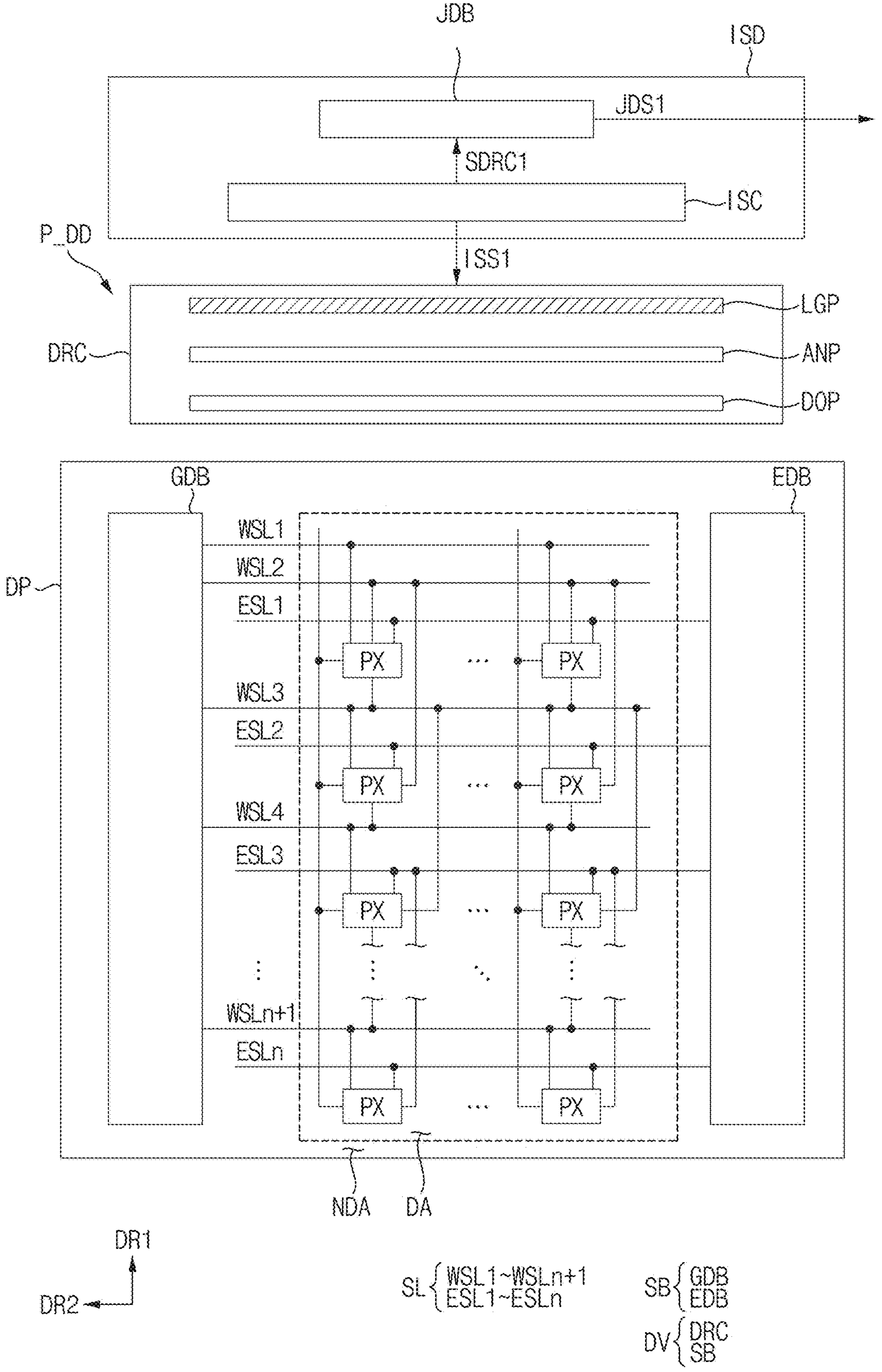
FIGS. 11 to 18 are views for describing the method for inspecting the display device according to an embodiment.

Referring to FIGS. 9 and 11, in the determining of the defect of the logic part LGP (S110), while the logic part LGP is enabled, and the analog part ANP, the scan block SB, and the data output part DOP are disabled, a current SDRC1 (hereinafter referred to as a "first sub-driving current") provided to the preliminary display device P_DD may be measured, and the defect of the logic part LGP may be determined based on the first sub-driving current SDRC1. According to an embodiment, an inspection controller ISC may provide a first inspection signal ISS1 for enabling only the logic part LGP to a driving chip DRC while disabling the analog part ANP and the data output part DOP. Since the defect of the logic part LGP included in the preliminary display device P_DD is determined, a defect may be prevented from occurring in a display device DD manufactured from the preliminary display device P_DD including the logic part LGP having the defect.

Figure 12:
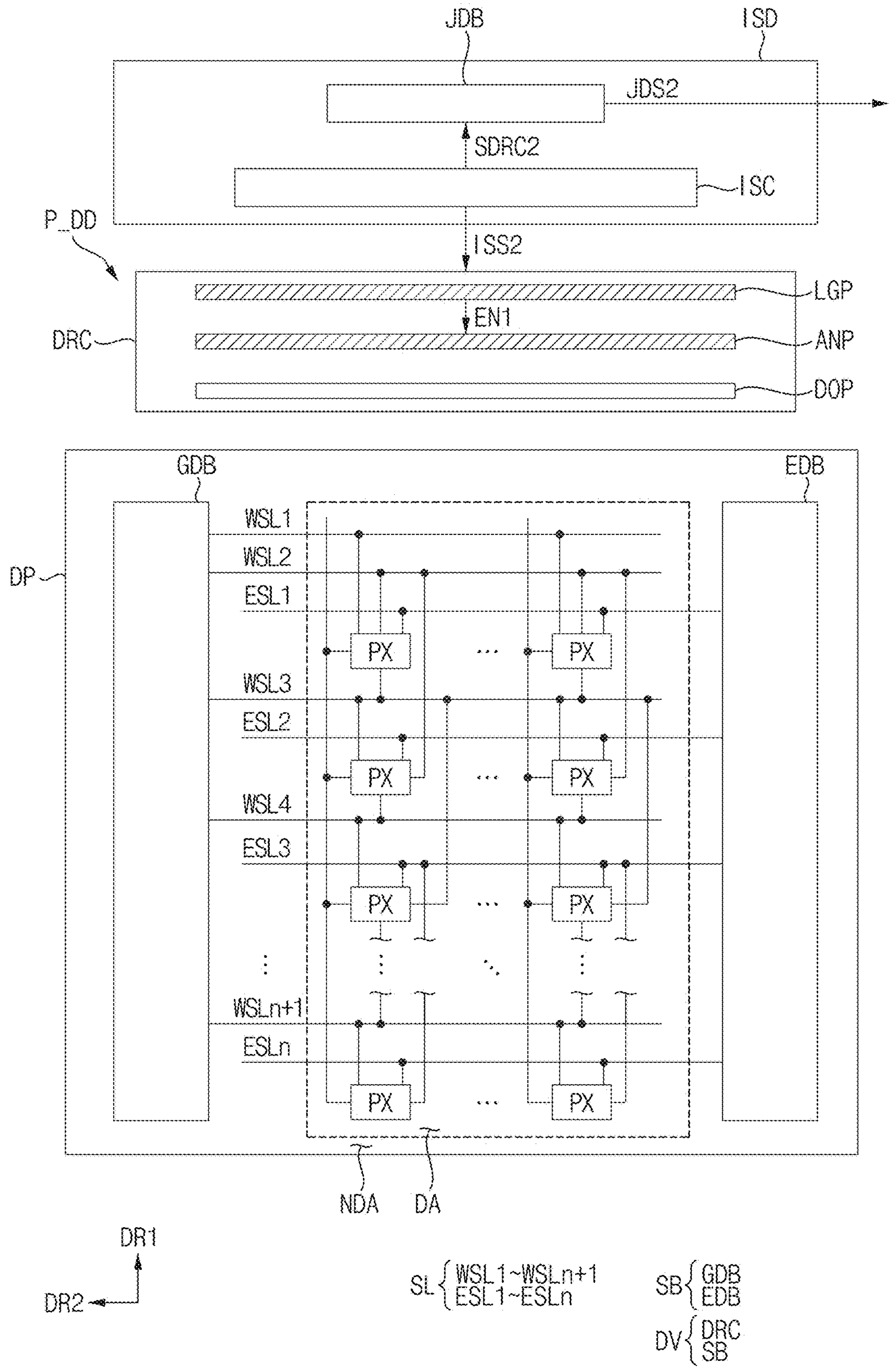

Referring to FIGS. 9 and 12, in the determining of the defect of the analog part ANP (S120), while the logic part LGP and the analog part ANP are enabled, and the scan block SB and the data output part DOP are disabled, a current SDRC2 (hereinafter referred to as a "second sub-driving current") provided to the preliminary display device P_DD may be measured, and the defect of the analog part ANP may be determined based on the second sub-driving current SDRC2. According to an embodiment, the inspection controller ISC may provide a second inspection signal ISS2 for enabling the logic part LGP and the analog part ANP to the driving chip DRC while disabling the data output part DOP. The logic part LGP may generate a first output signal EN1 for enabling the analog part ANP, and provide the first output signal EN1 to the analog part ANP. Since the defect of the analog part ANP included in the preliminary display device P_DD is determined, a defect may be prevented from occurring in a display device DD manufactured from the preliminary display device P_DD including the analog part ANP having the defect.

Figure 13:
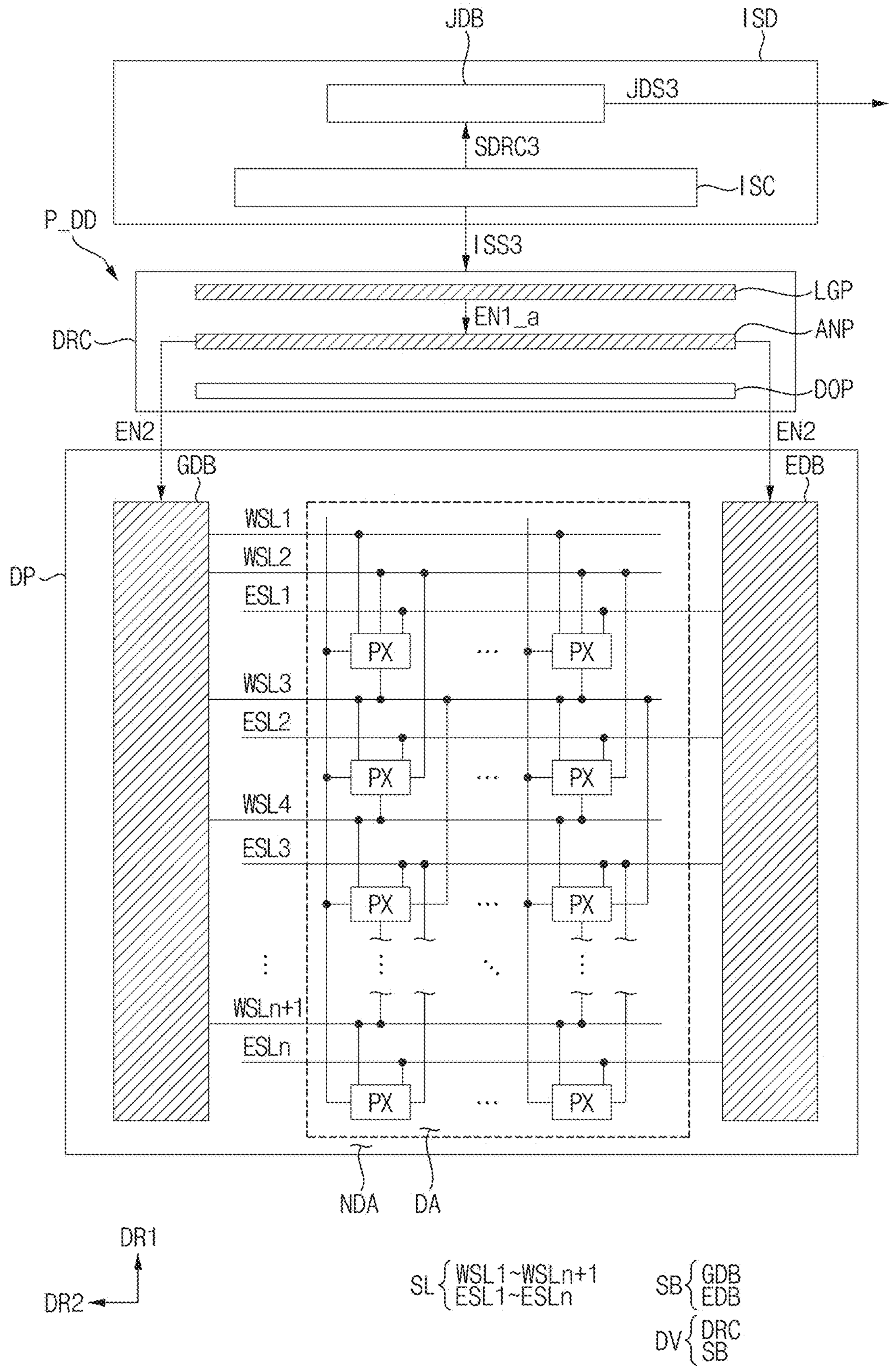

Referring to FIGS. 9 and 13, in the determining of the defect of the scan block SB (S130), while the logic part LGP, the analog part ANP, and the scan block SB are enabled, and the data output part DOP is disabled, a current SDRC3 (hereinafter referred to as a "third sub-driving current") provided to the preliminary display device P_DD may be measured, and the defect of the scan block SB may be determined based on the third sub-driving current SDRC3. According to an embodiment, the inspection controller ISC may provide a third inspection signal ISS3 for enabling the scan block SB to the driving chip DRC. The logic part LGP may generate a first output signal EN1_*a* for enabling the analog part ANP, and provide the first output signal EN1_*a* to the analog part ANP. The analog part ANP may generate a second output signal EN2 for enabling the scan block SB, and provide the second output signal EN2 to the scan block SB. According to an embodiment, the second output signal EN2 may include a high gate voltage (VGH of FIG. 4) and a low gate voltage (VGL of FIG. 4). Since the defect of the scan block SB included in the preliminary display device P_DD is determined, a defect may be prevented from occurring in a display device DD manufactured from the preliminary display device P_DD including the scan block SB having the defect.

Figure 14:
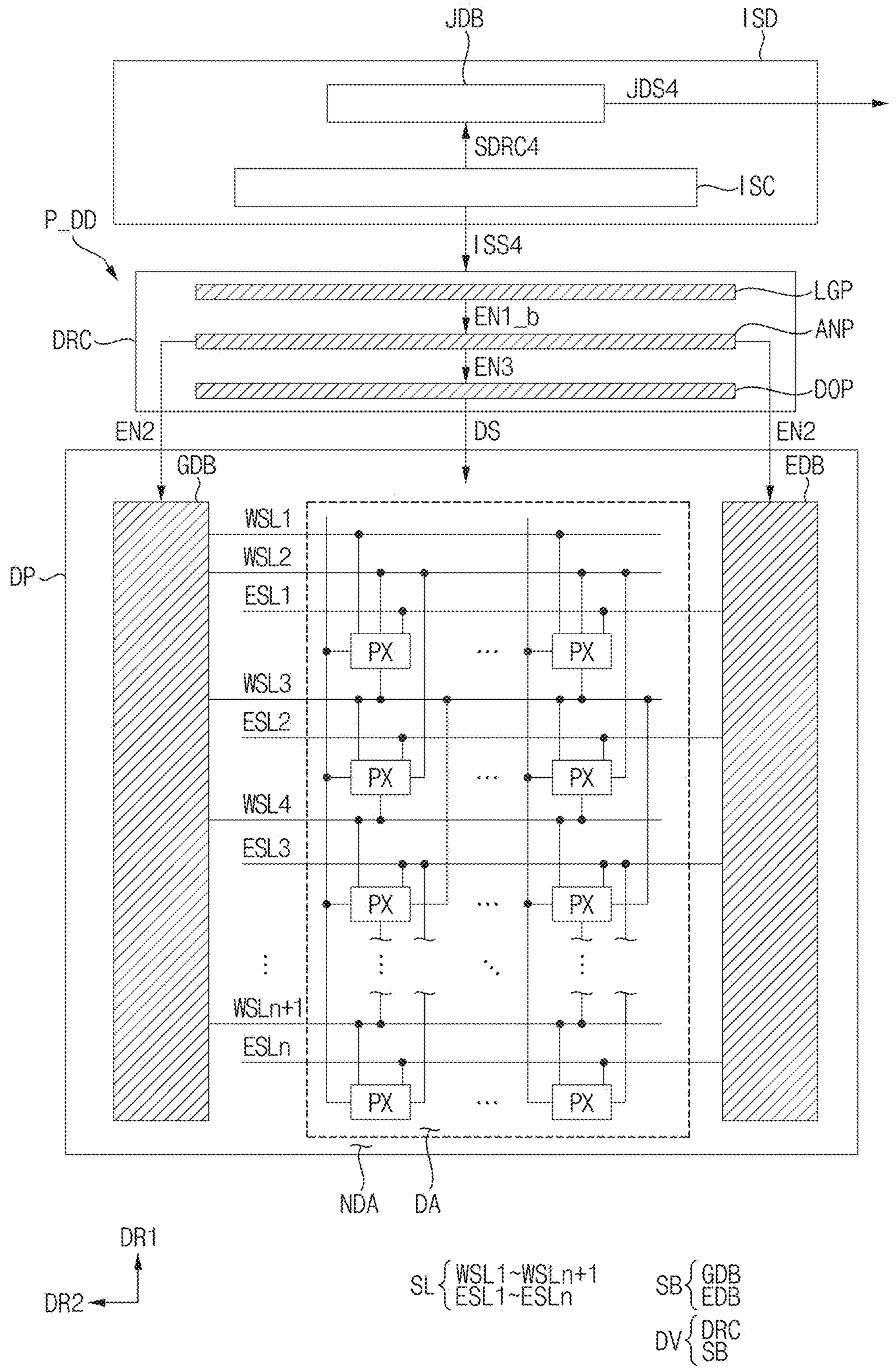

Referring to FIGS. 9 and 14, in the determining of the defect of the data output part DOP (S140), while the logic part LGP, the analog part ANP, the scan block SB, and the data output part DOP are enabled, and the display panel DP is disabled, a current SDRC4 (hereinafter referred to as a "fourth sub-driving current") provided to the preliminary display device P_DD may be measured, and the defect of the data output part DOP may be determined based on the fourth sub-driving current SDRC4. According to an embodiment, the fourth sub-driving current SDRC4 may include a buffer current (IBF of FIG. 5). According to an embodiment, the inspection controller ISC may provide a fourth inspection signal ISS4 for enabling the data output part DOP to the driving chip DRC. The logic part LGP may generate a first output signal EN1_*b* for enabling the analog part ANP, and provide the first output signal EN1_*b* to the analog part ANP.

The analog part ANP may generate a second output signal EN2 for enabling the scan block SB and a third output signal EN3 for enabling the data output part DOP. The analog part ANP may provide the second output signal EN2 to the scan block SB, and provide the third output signal EN3 to the data output part DOP. The data output part DOP may provide a data signal DS to the display panel DP. Since the defect of the data output part DOP included in the preliminary display device P_DD is determined, a defect may be prevented from occurring in a display device DD manufactured from the preliminary display device P_DD including the data output part DOP having the defect.

Figure 15:
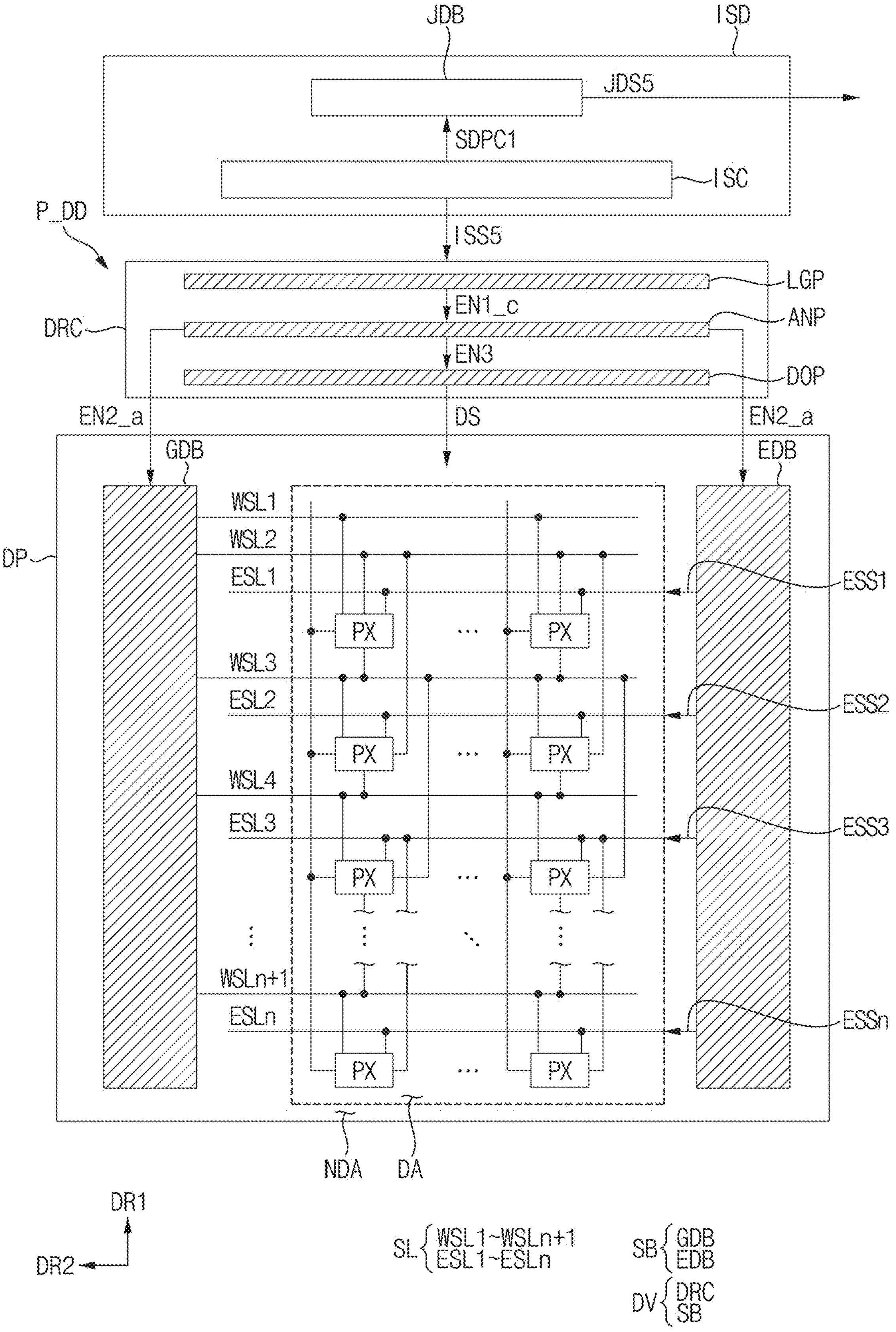

Referring to FIGS. 9 and 15, in the determining of the connection state between the pixels PX and the emission scan lines ESL1 to ESLn (S210), while emission scan signals ESS1 to ESSn are provided to the pixels PX, and write scan signals WSS1 to WSSn+1 are not provided to the pixels PX, a current SDPC1 (hereinafter referred to as a "first sub-display current") provided to the preliminary display device P_DD may be measured, and the connection state between the pixels PX and the emission scan lines ESL1 to ESLn may be determined based on the first sub-display current SDPC1. According to an embodiment, the inspection controller ISC may provide a fifth inspection signal ISS5 for providing the emission scan signals ESS1 to ESSn to the pixels PX to the driving chip DRC. The logic part LGP may generate a first output signal EN1_*c* for enabling the analog part ANP, and provide the first output signal EN1_*c* to the analog part ANP. The analog part ANP may generate a second output signal EN2_*a* for enabling the scan block SB and a third output signal EN3 for enabling the data output part DOP. The analog part ANP may provide the second output signal EN2_*a* to the scan block SB, and provide the third output signal EN3 to the data output part DOP. The scan block SB may provide the emission scan signals ESS1 to ESSn to the pixels PX. Since a defect of a connection between the pixels PX and the emission scan lines ESL1 to ESLn included in the preliminary display device P_DD is determined, a defect may be prevented from occurring in a display device DD manufactured from the preliminary display device P_DD including the pixels PX having the connection defect with the emission scan lines ESL1 to ESLn.

Figure 16:
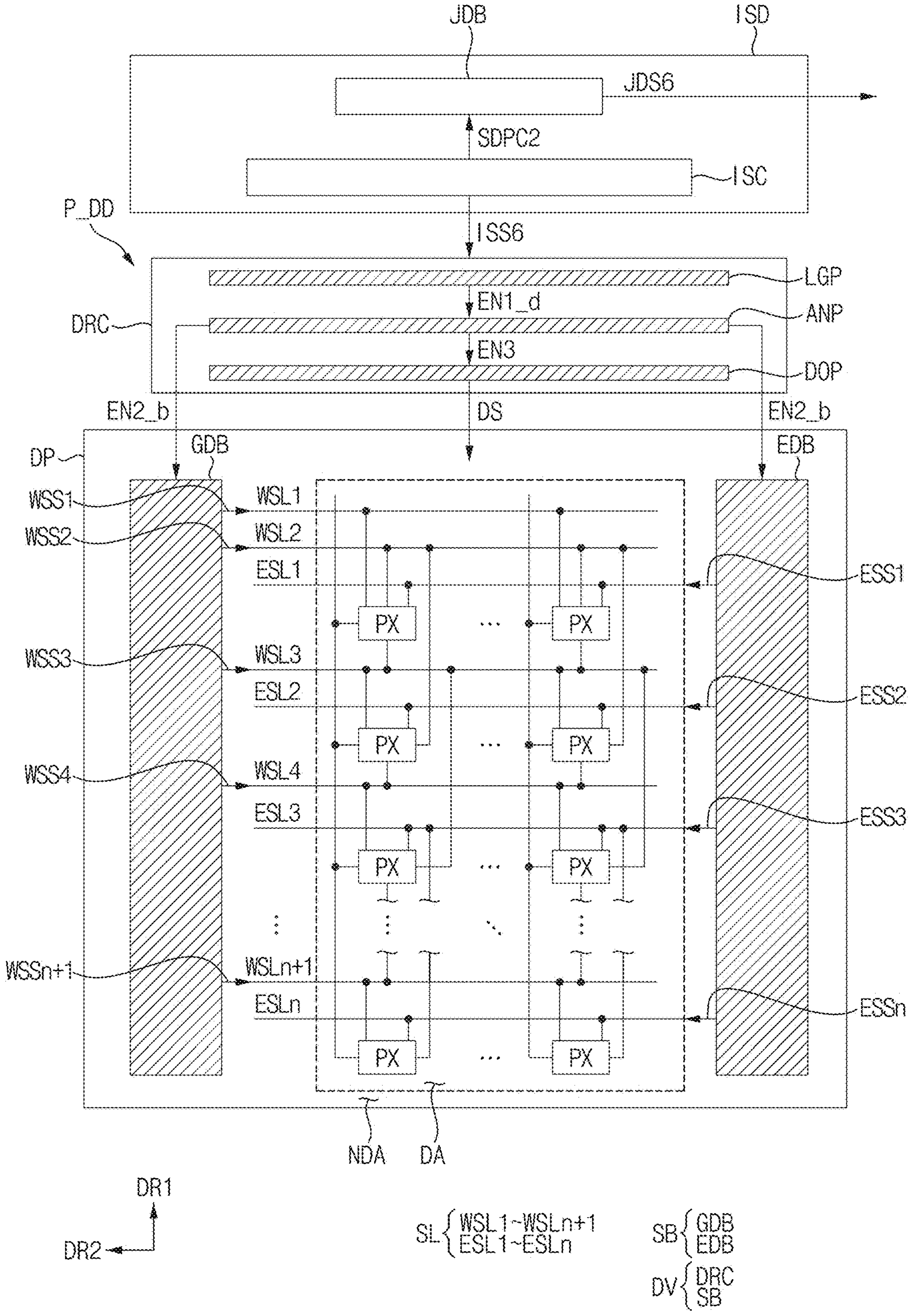

Referring to FIGS. 9 and 16, in the determining of the connection state between the pixels PX and the write scan lines WSL1 to WSLn+1 (S220), while the write scan signals WSS1 to WSSn+1 are provided to the pixels PX, and a first pixel voltage VDD, a second pixel voltage VSS, and an initialization voltage VINT are not provided to the pixels PX, a current SDPC2 (hereinafter referred to as a "second sub-display current") provided to the preliminary display device P_DD may be measured, and the connection state between the pixels PX and the write scan lines WSL1 to WSLn+1 may be determined based on the second sub-display current SDPC2. According to an embodiment, the inspection controller ISC may provide a sixth inspection signal ISS6 for providing the write scan signals WSS1 to WSSn+1 to the pixels PX to the driving chip DRC. The logic part LGP may generate a first output signal EN1_*d* for enabling the analog part ANP, and provide the first output signal EN1_*d* to the analog part ANP. The analog part ANP may generate a second output signal EN2_*b* for enabling the scan block SB and a third output signal EN3 for enabling the data output part DOP. The analog part ANP may provide the second output signal EN2_*b* to the scan block SB, and provide the third output signal EN3 to the data output part DOP. The scan block SB may provide the emission scan signals ESS1 to ESSn and the write scan signals WSS1 to WSSn+1 to the pixels PX. Since a defect of a connection between the pixels PX and the write scan lines WSL1 to WSLn+1 included in the preliminary display device P_DD is determined, a defect may be prevented from occurring in a display device DD manufactured from the preliminary display device P_DD including the pixels PX having the connection defect with the write scan lines WSL1 to WSLn+1.

Figure 17:
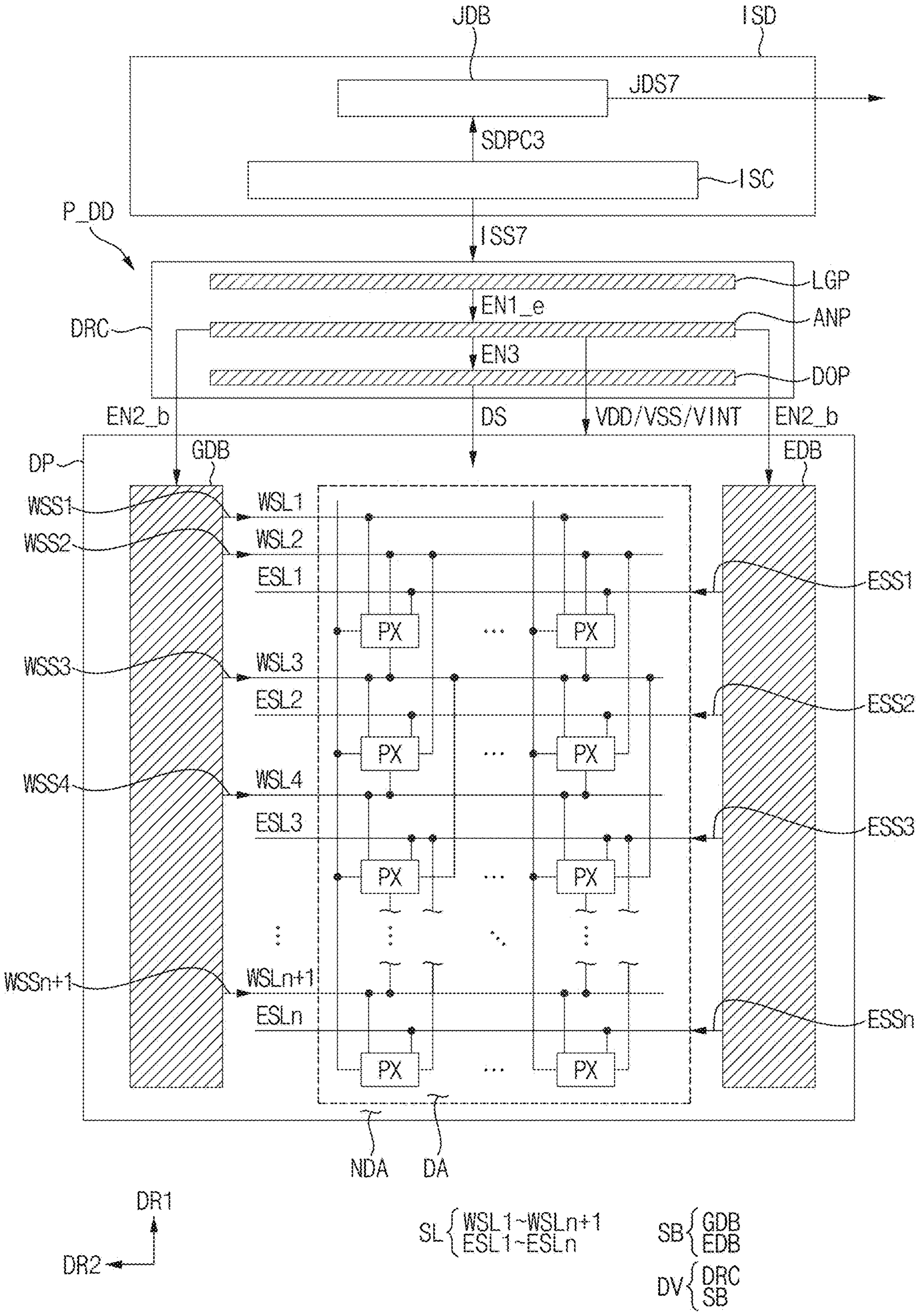

Referring to FIGS. 9 and 17, in the determining of the connection state between the pixels PX and the driving voltage lines (S230), while the first pixel voltage VDD, the second pixel voltage VSS, and the initialization voltage VINT are provided to the pixels PX, and the display panel DP does not display the image IM, a current SDPC3 (hereinafter referred to as a "third sub-display current") provided to the preliminary display device P_DD may be measured, and the connection state between the pixels PX and the driving voltage lines may be determined based on the third sub-display current SDPC3. According to an embodiment, the inspection controller ISC may provide a seventh inspection signal ISS7 for providing the first pixel voltage VDD, the second pixel voltage VSS, and the initialization voltage VINT to the pixels PX to the driving chip DRC. The logic part LGP may generate a first output signal EN1_*e* for enabling the analog part ANP, and provide the first output signal EN1_*e* to the analog part ANP. The analog part ANP may generate a second output signal EN2_*b* for enabling the scan block SB, a third output signal EN3 for enabling the data output part DOP, the first pixel voltage VDD, the second pixel voltage VSS, and the initialization voltage VINT. The analog part ANP may provide the second output signal EN2_*b* to the scan block SB, provide the third output signal EN3 to the data output part DOP, and provide the first pixel voltage VDD, the second pixel voltage VSS, and the initialization voltage VINT to the pixels PX. The scan block SB may provide the emission scan signals ESS1 to ESSn and the write scan signals WSS1 to WSSn+1 to the pixels PX. Since a defect of a connection between the pixels PX and the driving voltage lines included in the preliminary display device P_DD is determined, a defect may be prevented from occurring in a display device DD manufactured from the preliminary display device P_DD including the pixels PX having the connection defect with the driving voltage lines.

Figure 18:
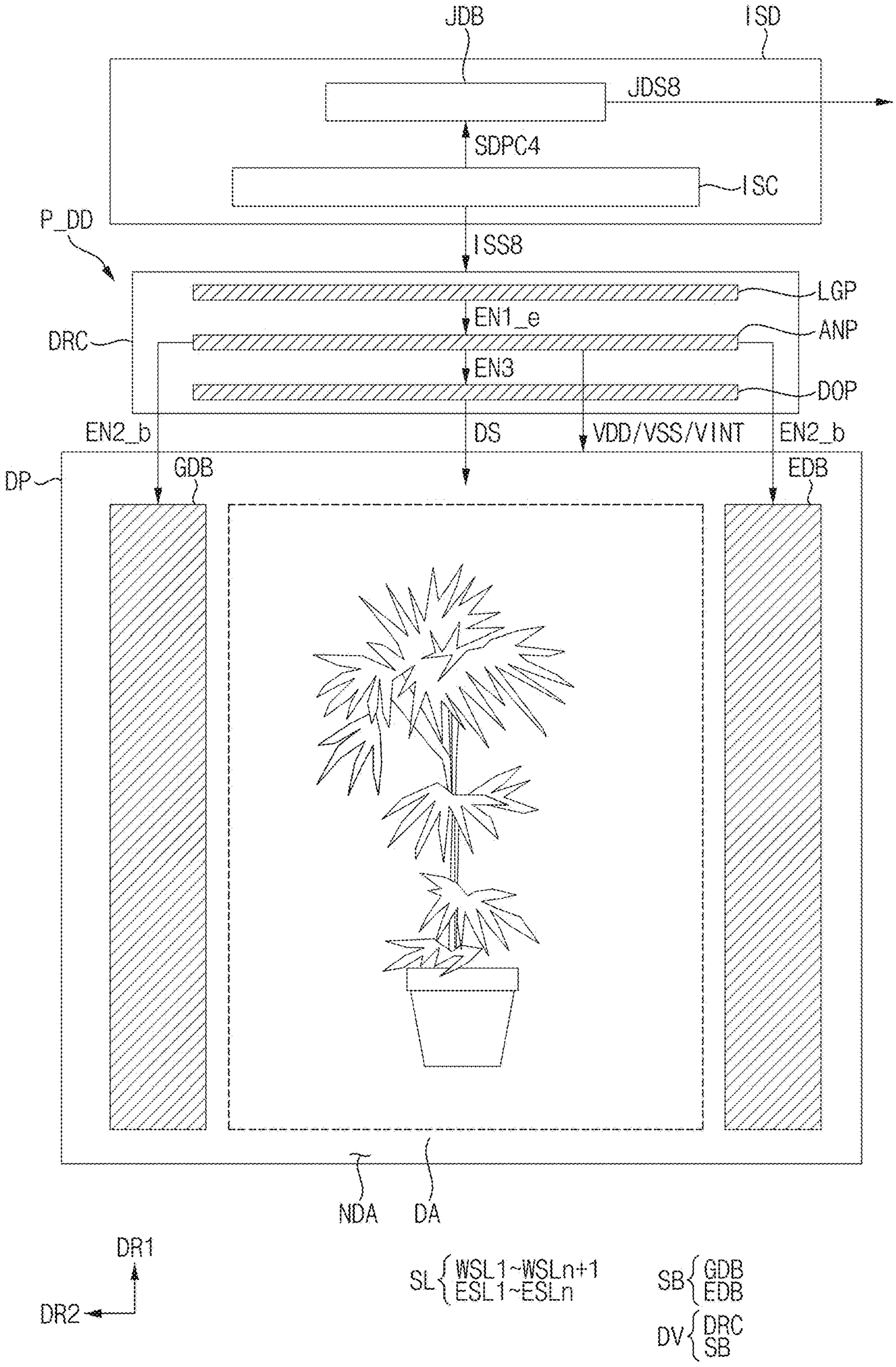

Referring to FIGS. 9 and 18, in the determining of the defect of the image IM displayed on the display panel DP (S240), a current SDPC4 (hereinafter referred to as a "fourth sub-display current") provided to the preliminary display device P_DD when the image IM is displayed on the display panel DP may be measured, and the defect of the image IM displayed on the display panel DP may be determined based on the fourth sub-display current SDPC4. According to an embodiment, the inspection controller ISC may provide an eighth inspection signal ISS8 for displaying the image IM on the display panel DP to the driving chip DRC. When the eighth inspection signal ISS8 is provided to the driving chip DRC, the display panel DP may display the image IM. According to an embodiment, the image IM may include a test pattern or the like for determining the defect of the display panel DP.

The display device according to the embodiments may be applied to a display device included in a computer, a notebook, a mobile phone, a smart phone, a smart pad, a PMP, a PDA, an MP3 player, or the like.

Although the display devices and the methods for inspecting the display devices according to the embodiments have been described with reference to the drawings, the illustrated embodiments are examples, and may be modified and changed by a person having ordinary knowledge in the relevant technical field without departing from the technical spirit described in the following claims.

As used in connection with various embodiments of the disclosure, each of the source driving block SDB, the voltage generation block VGB, the gate driving block GDB, and the emission driving block EDB may be implemented in hardware, software, or firmware, for example, implemented in a form of an application-specific integrated circuit (ASIC).

What is claimed is:

1. A display device comprising:

a display panel configured to display an image corresponding to an image signal, and including pads; and a driving chip configured to provide data signals to the pads, wherein the driving chip includes:

an analog part configured to convert an input voltage received through an input line into a driving voltage, and convert an image data signal into the data signals; and buffers configured to receive a buffer voltage through a buffer line that is different from the input line, and output the data signals to the pads, wherein, when whether a short defect between the pads exists or not is inspected, odd-numbered buffers among the buffers are configured to output the data signals, which have a first polarity, and even-numbered buffers among the buffers are configured to output the data signals, which have a second polarity that is opposite to the first polarity, wherein a buffer current flowing through the buffer line when the short defect exists between at least two adjacent pads among the pads is greater than a buffer current flowing through the buffer line when the short defect does not exist between the pads.

2. The display device of claim 1, wherein a level of the buffer voltage is equal to a level of the input voltage.

3. The display device of claim 1, wherein the driving chip further includes a logic part configured to convert the image signal into the image data signal.

4. The display device of claim 1, wherein the display panel further includes:

data lines connected to the pads, respectively; and pixels connected to the data lines.

5. The display device of claim 4, wherein the driving voltage includes a first pixel voltage provided to an anode of a light emitting diode included in each of the pixels, a second pixel voltage provided to a cathode of the light emitting diode, and an initialization voltage for initializing a gate of a driving transistor included in each of the pixels, and the first pixel voltage, the second pixel voltage, and the initialization voltage are provided to each of the pixels.

6. The display device of claim 4, further comprising a scan block configured to provide scan signals to the pixels.

7. The display device of claim 6, wherein the driving voltage includes a high gate voltage for turning off a switching transistor included in each of the pixels, and a low gate voltage for turning on the switching transistor, and the high gate voltage and the low gate voltage are provided to the scan block.

8. The display device of claim 1, further comprising a DC-DC converter configured to convert an external voltage into the input voltage, and apply the input voltage to the input line.

9. The display device of claim 8, wherein the DC-DC converter is configured to convert the external voltage into the buffer voltage, and apply the buffer voltage to the buffer line.

10. A method for inspecting a display device, in which the display device includes a display panel configured to display an image corresponding to an image signal and including pads, and a driving chip including buffers configured to provide data signals to the pads, the method comprising:

providing a buffer voltage to the buffers through a buffer line;

outputting the data signals from the buffers to the pads;

measuring a buffer current flowing through the buffer line; and determining whether a short defect between the pads exists or not based on the buffer current, wherein, in the outputting of the data signals, odd-numbered buffers among the buffers are configured to output the data signals, which have a first polarity, and even-numbered buffers among the buffers are configured to output the data signals, which have a second polarity that is opposite to the first polarity, wherein the buffer current when the short defect exists between at least two adjacent pads among the pads is greater than the buffer current when the short defect does not exist between the pads.

11. The method of claim 10, further comprising:

determining a defect of a driving driver including the driving chip based on a current measured while enabling the driving driver and disabling the display panel; and determining a defect of the display panel based on a current measured while enabling the driving driver and the display panel.

12. The method of claim 11, wherein, the determining of the defect of the display panel is performed, when the driving driver is determined to be normal in the determining of the defect of the driving driver.

13. A method for inspecting a display device, in which the display device includes a display panel configured to display an image corresponding to an image signal and including pads, and a driving chip including buffers configured to provide data signals to the pads, the method comprising:

providing a buffer voltage to the buffers through a buffer line;

outputting the data signals from the buffers to the pads;

measuring a buffer current flowing through the buffer line;

determining whether a short defect between the pads exists or not based on the buffer current; and determining a defect of a driving driver including the driving chip based on a current measured while enabling the driving driver and disabling the display panel, wherein the driving chip includes an analog part configured to convert an image data signal into the data signals, a logic part configured to convert the image signal into the image data signal, and a data output part including the buffers, and wherein the determining of the defect of the driving driver includes:

determining a defect of the logic part based on a current measured while enabling the logic part and disabling the analog part and the data output part; and determining a defect of the analog part based on a current measured while enabling the logic part and the analog part and disabling the data output part.

14. The method of claim 13, wherein the driving driver further includes a scan block configured to provide scan signals to the display panel, and wherein the determining of the defect of the driving driver further includes:

determining a defect of the scan block based on a current measured while enabling the logic part, the analog part, and the scan block and disabling the data output part.

15. The method of claim 14, wherein the determining of the defect of the driving driver further includes:

determining a defect of the data output part based on a current measured while enabling the logic part, the analog part, the scan block, and the data output part.

16. The method of claim 15, wherein the determining of the defect of the data output part includes:

the providing of the buffer voltage;

the outputting of the data signals;

the measuring of the buffer current; and the determining of whether the short defect between the pads exists or not.

* * * * *